United States Patent
Gallagher et al.

(10) Patent No.: US 8,717,461 B2
(45) Date of Patent: May 6, 2014

(54) IDENTIFYING COLLECTION IMAGES WITH SPECIAL EVENTS

(75) Inventors: Andrew C. Gallagher, Brockport, NY (US); Samuel M. Fryer, Fairport, NY (US); Alexander C. Loui, Penfield, NY (US); Jason R. Oliver, Rush, NY (US); Neal Eckhaus, Rochester, NY (US); Kenneth A. Parulski, Rochester, NY (US)

(73) Assignee: Intellectual Ventures Fund 83 LLC, Las Vegas, NV (US)

( * ) Notice: Subject to any disclaimer, the term of this patent is extended or adjusted under 35 U.S.C. 154(b) by 156 days.

(21) Appl. No.: 12/796,698

(22) Filed: Jun. 9, 2010

(65) Prior Publication Data

US 2010/0245625 A1  Sep. 30, 2010

Related U.S. Application Data

(63) Continuation of application No. 11/178,992, filed on Jul. 11, 2005, now abandoned.

(51) Int. Cl.
*H04N 5/76* (2006.01)
*G06K 9/62* (2006.01)

(52) U.S. Cl.
USPC ............ 348/231.5; 348/231.2; 348/231.3; 382/224

(58) Field of Classification Search
USPC ......... 348/231.2, 231.3, 231.5; 382/224, 225, 382/226, 228
See application file for complete search history.

(56) References Cited

U.S. PATENT DOCUMENTS

| 5,164,831 | A | 11/1992 | Kuchta et al. |
| 6,108,640 | A | 8/2000 | Slotznick |
| 6,606,411 | B1 | 8/2003 | Loui et al. |
| 6,810,146 | B2 | 10/2004 | Loui et al. |
| 7,415,662 | B2 | 8/2008 | Rothmuller et al. |
| 7,636,733 | B1* | 12/2009 | Rothmuller .................. 382/305 |
| 8,046,330 | B2* | 10/2011 | Ozaki et al. .................. 707/639 |
| 2002/0080256 | A1 | 6/2002 | Bates et al. |
| 2002/0101519 | A1* | 8/2002 | Myers .......................... 348/232 |
| 2002/0140820 | A1* | 10/2002 | Borden, IV ............. 348/207.99 |

(Continued)

FOREIGN PATENT DOCUMENTS

GB  2403304  12/2004

OTHER PUBLICATIONS

Communication received on EP Application 06785560.1, dated Jun. 2, 2009.

(Continued)

*Primary Examiner* — Tuan Ho
*Assistant Examiner* — Selam Gebriel

(57) ABSTRACT

A method for associating event times or time periods with digital images in a collection for determining if a digital image is of interest, includes storing a collection of digital images each having an associated capture time; comparing the associated capture time in the collection with a special event time to determine if a digital image in the collection is of interest, wherein the comparing step includes calculation of a special event time associated with a special event based on the calendar time associated with the special event and using such information to perform the comparison step; and associating digital images of interest with the special event.

35 Claims, 13 Drawing Sheets

(56) References Cited

U.S. PATENT DOCUMENTS

| | | | |
|---|---|---|---|
| 2002/0165753 A1* | 11/2002 | Worthington | 705/8 |
| 2003/0050982 A1 | 3/2003 | Chang | |
| 2003/0103149 A1* | 6/2003 | Kinjo et al. | 348/231.5 |
| 2003/0184653 A1 | 10/2003 | Ohkubo | |
| 2004/0008872 A1* | 1/2004 | Goldberg | 382/115 |
| 2004/0075752 A1* | 4/2004 | Valleriano et al. | 348/231.3 |
| 2004/0078389 A1* | 4/2004 | Hamilton | 707/104.1 |
| 2004/0100566 A1* | 5/2004 | Valleriano et al. | 348/231.99 |
| 2004/0135904 A1 | 7/2004 | Shiota et al. | |
| 2004/0201685 A1* | 10/2004 | Seaman et al. | 348/207.1 |
| 2004/0201740 A1 | 10/2004 | Nakamura et al. | |
| 2005/0044066 A1* | 2/2005 | Hooper et al. | 707/3 |
| 2005/0050043 A1* | 3/2005 | Pyhalammi et al. | 707/6 |
| 2006/0139709 A1* | 6/2006 | Bifano et al. | 358/527 |
| 2008/0037826 A1* | 2/2008 | Sundstrom et al. | 382/103 |
| 2008/0306921 A1* | 12/2008 | Rothmuller et al. | 707/3 |
| 2011/0032388 A1* | 2/2011 | Manico et al. | 348/231.99 |

OTHER PUBLICATIONS

Communication received on EP Application 06785560.1, mailed Jan. 7, 2011.
Final Rejection on U.S. Appl. No. 11/178,992, mailed Apr. 14, 2009.
Final Rejection on U.S. Appl. No. 11/178,992, mailed Oct. 26, 2010.
Final Rejection on U.S. Appl. No. 11/178,992, mailed Feb. 16, 2010.
International Preliminary Report on Patentability issued on PCT/US2006/024754, issued Jan. 16, 2008.
International Search Report for PCT/US2006/024754, mailed Jan. 2, 2007.
Non-Final Office Action on U.S. Appl. No. 11/178,992, mailed Dec. 29, 2008.
Non-Final Office Action on U.S. Appl. No. 11/178,992, mailed May 11, 2010.
Non-Final Office Action on U.S. Appl. No. 11/178,992, mailed Sep. 3, 2009.
Graham et al, Time as Essence for Photo Browsing Through Personal Digital Libraries, JDCL (Jul. 2002).

* cited by examiner

IDENTIFYING COLLECTION IMAGES WITH SPECIAL EVENTS

CROSS REFERENCE TO RELATED APPLICATIONS

This application is a continuation of U.S. patent application Ser. No. 11/178,992 filed Jul. 11, 2005 now abandoned, entitled "Identifying Collection Images with Special Events" by Gallagher et al, the disclosure of which is incorporated herein.

Reference is made to commonly assigned U.S. patent application Ser. No. 11/116,729, filed Apr. 28, 2005 (now U.S. Pat. No. 7,522,773), entitled "Using Time in Recognizing Persons in Images" by Gallagher et al and U.S. patent application Ser. No. 11/143,541 filed Jun. 2, 2005, entitled "Using Photographer Identity to Classify Images" by Gallagher et al, the disclosures of which are incorporated herein.

FIELD OF THE INVENTION

The present invention related to an improved way to identify digital images from a collection, making use of special events.

BACKGROUND OF THE INVENTION

With the advent of digital photography, consumers are amassing large media collections of digital images and videos. For purposes of this description, the term "images" will be understood to include both still images and "videos" which are a collection of image frames, often having associated audio stream. Therefore, an image collection can contain images or videos or both. The average number of images captures with digital cameras per photographer is still increasing each year. As a consequence, the organization and retrieval of images and videos is already a problem for the typical consumer. Currently, the length of time spanned by a typical consumer's digital image collection is only a few years. The organization and retrieval problem will continue to grow as the length of time spanned by the average digital image and video collection increases.

The automatic organization of a media collection, either as an end in itself or for use in other applications—has been the subject of recent research. Relatively sophisticated image content analysis techniques have been used for image indexing and organization. For image indexing and retrieval applications, simple text analysis techniques have also been used on text or spoken annotations associated with individual images or videos. The recent research has involved a number of techniques and tools for automatic albuming of images and videos.

Date and time information from the camera has been used to perform event segmentation, as for example described in U.S. Pat. No. 6,606,411 by Loui and Pavie. An event consists of a set of images of videos related to a common event, for example "trip to the beach."

U.S. Pat. No. 6,810,146 by Loui and Stent, described extracting certain types of information from spoken annotations, or the transcriptions of spoken annotations, associated with photographs, and then using the results to perform event segmentation, identification, and summarization.

Certain applications allow for viewing images on a timeline. In essence, the images can be viewed or sorted into consecutive order based on the image capture time. For example, the application Picasa 2, distributed by Google, has a timeline view where groups or sets of images and videos are shown to the user and each image set has an associated time (e.g. "April 2005"). In addition, the Adobe application Album 2.0 has a calendar view where calendar pages are shown and small versions of images captured on a specific calendar date are shown on that date. In each case, the software groups images related by capture time into sets. However, the sets of images are not labeled with meaningful names other than the capture date or date range. Thus, the only calendar information used by these applications is the day, month, and year. They do not use any occasion (e.g. Thanksgiving) or appointment (e.g. vacation trip to Florida) information to label the images with meaningful names.

Furthermore, U.S. Pat. No. 6,108,640 describes a method for determining periodic occasions such as holidays. However, there is no description of assigning meaningful labels to images or sets of images.

In UK Patent Application GB2403304A, Rowe describes a method of labeling images with labels based on the image capture dates corresponding to national events for later use in text-based search and retrieval of images. This method cannot provide for the fact that for many people, many national holidays are not observed. For example, few people actually celebrate Groundhog Day. Subsequent searches by a user for images of "groundhogs" would return images captured on February 2. Furthermore, since may consumer images are taken on occasions that are not associated with national holidays (such as the birthdays of family members, or vacation trips), this method cannot provide useful labels for most consumer photos.

In U.S. Patent Application Publication U.S. 20040201740A1, Nakamura and Gibson describe a method of placing images into storage locations based on calendar information. Their method does not provide for automatic annotation of images.

In U.S. Patent application Publication U.S. 20050044066 A1, Hooper and Mao describe a calendar-based image asset organization method. Their method allows people to indicate via a graphical user interface a date range of interest. Images captured during that date range are then retrieved for the user. The method does not provide for automatic annotation of images.

SUMMARY OF THE INVENTION

An object of the present invention to provide an improved way of identifying digital images of interest from a collection of digital images.

This object is achieved by storing a collection of digital images or videos or both each having an associated capture time; comparing the associated capture time in the collection with a special event time to determine if a digital image or video in the collection is of interest, wherein the comparing step includes calculation of a special event time associated with a special event based on the calendar time associated with the special event and using such information to perform the comparison step; and associating digital images and videos of interest with the special event.

Another object of the present invention is to provide an improved way to labeling digital images captured by a digital capture device.

This object is achieved by transferring and storing calendar information in a digital camera device, the calendar information including occasion or appointment information, capturing and storing a digital image in the digital camera device, determining a capture time for the captured digital image, automatically comparing the capture time with the calendar information to determine a special event label, and storing the special event label in association with the captured digital image.

It has been found that digital images of interest can be effectively searched in a collection of digital images using special event information that has associated event time or time period information.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

In the following description, some embodiments of the present invention will be described as software programs. Those skilled in the art will readily recognize that the equivalent of such software can also be constructed in hardware. Because image manipulation algorithms and systems are well known, the present description will be directed in particular to algorithms and systems forming part of, or cooperating more directly with, the method in accordance with the present invention. Other aspects of such algorithms and systems, and hardware or software for producing and otherwise processing the image signals involved therewith, not specifically shown or described herein can be selected from such systems, algorithms, components, and elements known in the art. Given the description as set forth in the following specification, all software implementation thereof is conventional and within the ordinary skill in such arts.

Figure 1:
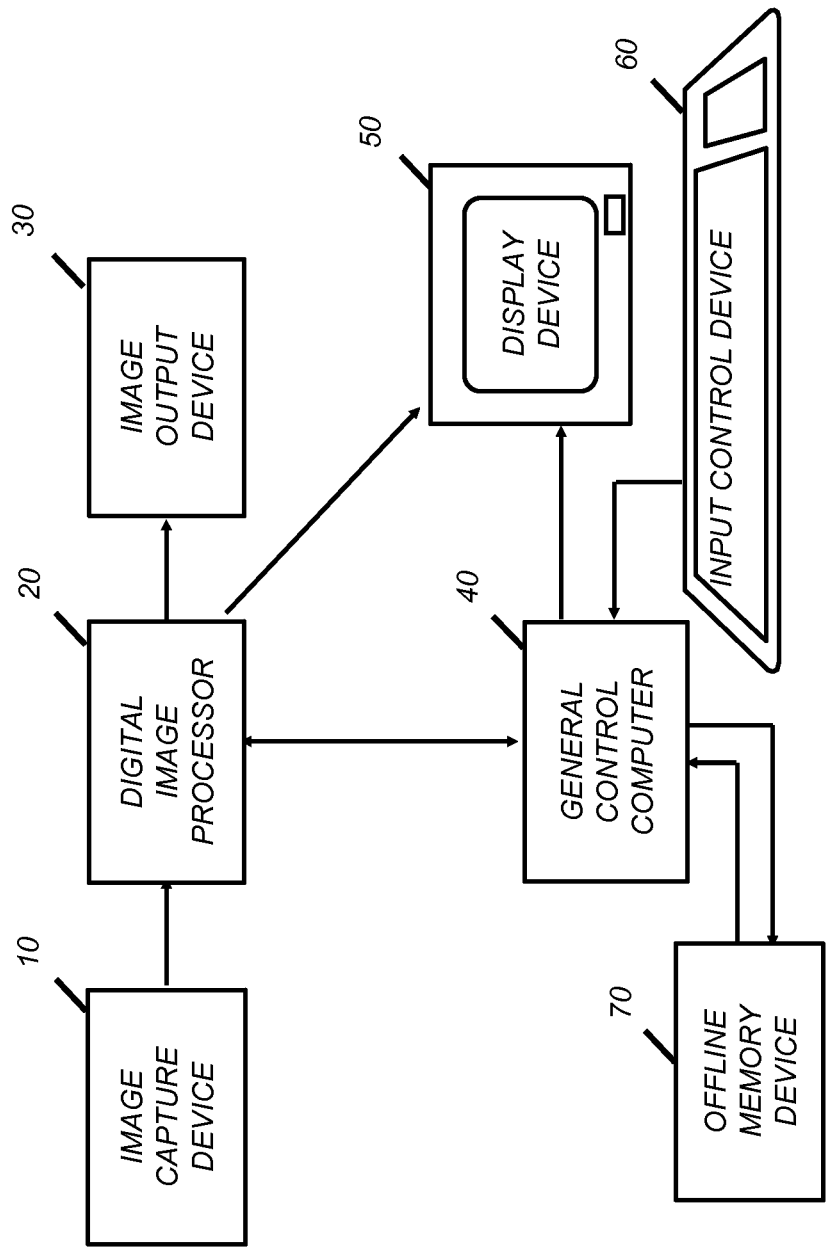
FIG. 1 is a schematic diagram of computer system that can implement the present invention.

The present invention can be implemented in computer hardware and computerized equipment. For example, the method can be performed in a digital camera (as will be described later in reference to FIG. 10), a digital printer, on an internet server, on a kiosk, and on a personal computer. Referring to FIG. 1, there is illustrated a computer system for implementing the present invention. Although the computer system is shown for the purpose of illustrating a preferred embodiment, the present invention is not limited to the computer system shown, but can be used on any electronic processing system such as found in digital cameras, home computers, kiosks, retail or wholesale photofinishing, or any other system for the processing of digital images. The computer system includes a microprocessor-based unit 20 (also referred to herein as a digital image processor) for receiving and processing software programs and for performing other processing functions. The digital image processor 20 processes images from image capture devices 10 such as cameras, scanners, or computer image generation software. The digital image processor 20 can be used to process digital images to make adjustments for overall brightness, tone scale, image structure, etc. of digital images in a manner such that a pleasing looking image is produced by an image output device. The digital image processor 20 interfaces with the general control computer 40 (also a microprocessor based unit) for exchanging data and commands. The general control computer 40 and the digital image processor 20 can be two different microprocessors, or the functions of each can be performs by a single physical microprocessor. The digital image processor 20 often outputs an image to an image output device 30 for example a printer for displaying the image. A display device 50 is electrically connected to the digital image processor 20 for displaying user-related information associated with the software, e.g., by means of a graphical user interface. A keyboard 60 is also connected to the microprocessor based unit 20 via the general control computer 40 for permitting a user to input information to the software. As an alternative to using the keyboard 60 for input, a mouse can be used for moving a selector on the display device 50 and for selecting an item on which the selector overlays, as is well known in the art. Digital images and other data can also be stored on an offline memory device 70 such as an external hard drive, flash media, a drive that writes to CD-ROM or DVD media, or the like.

A compact disk-read only memory (CD-ROM) which typically includes software programs, is inserted into the general control computer 40 for providing a means of inputting the software programs and other information to the general control computer 40 and the digital image processor 20. In addition, a floppy disk can also include a software program, and is inserted into the general control computer 40 for inputting the software program. Still further, the general control computer 40 can be programmed, as is well known in the art, for storing the software program internally. The general control computer 40 can have a network connection, such as a telephone line or wireless connection, to an external network such as a local area network or the Internet (370 in FIG. 10). Images can also be displayed on the display device 50 via a Flash EPROM memory card, such as the well-known PC Card, Compact Flash, SD, MemoryStick cards.

The image output device 30 provides a final image. The image output device 30 can be a printer or other output device that provides a paper or other hard copy final image. The image output device 30 can also be an output device that provides the final image as a digital file. The image output device 30 can also include combinations of output, such as a printed image and a digital file on a memory unit, such as a CD or DVD.

A digital image includes one or more digital image channels or color components. Each digital image channel is a two-dimensional array of pixels. Each pixel value relates to the amount of light received by the imaging capture device corresponding to the physical region of pixel. For color imaging applications, a digital image will often consist of red, green, and blue digital image channels. Motion imaging applications can be thought of as a sequence of digital images. Those skilled in the art will recognize that the present invention can be applied to, but is not limited to, a digital image channel for any of the herein-mentioned applications. Although a digital image channel is described as a two dimensional array of pixel values arranged by rows and columns, those skilled in the art will recognize that the present invention can be applied to non rectilinear arrays with equal effect. Those skilled in the art will also recognize that for digital image processing steps described herein below as replacing original pixel values with processed pixel values is functionally equivalent to describing the same processing steps as generating a new digital image with the processed pixel values while retaining the original pixel values.

It should also be noted that the present invention can be implemented in a combination of software or hardware and is not limited to devices that are physically connected or located within the same physical location. One or more of the devices illustrated in FIG. 1 can be located remotely and can be connected via a network. One or more of the devices can be connected wirelessly, such as by a radio-frequency link, either directly or via a network.

The present invention can be employed in a variety of user contexts and environments. Exemplary contexts and environments include, without limitation, wholesale digital photofinishing (which involves exemplary process steps or stages such as film in, digital processing, prints out), retail digital photofinishing (film in, digital processing, prints out), home printing (home scanned film or digital images, digital processing, prints out), desktop software (software that applies algorithms to digital prints to make them better—or even just to change them), digital fulfillment (digital images in—from media or over the web, digital processing, with images out—in digital form on media, digital form over the web, or printed on hard-copy prints), kiosks (digital or scanned input, digital processing, digital or hard copy output), mobile devices (e.g., PDA or cell phone that can be used as a processing unit, a display unit, or a unit to give processing instructions), and as a service offered via the World Wide Web.

In each case, the invention can stand alone or can be a component of a larger system solution. Furthermore, human interfaces, e.g., the scanning or input, the digital processing, the display to a user (if needed), the input of user requests or processing instructions (if needed), the output, can each be on the same or different devices and physical locations, and communication between the devices and locations can be via public or private network connections, or media based communication. Where consistent with the foregoing disclosure of the present invention, the method of the invention can be fully automatic, can have user input (be fully or partially manual), can have user or operator review to accept/reject the result, or can be assisted by metadata (metadata that can be user supplied, supplied by a measuring device (e.g. in a camera), or determined by an algorithm). Moreover, the algorithm(s) can interface with a variety of workflow user interface schemes.

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art.

Figure 2:
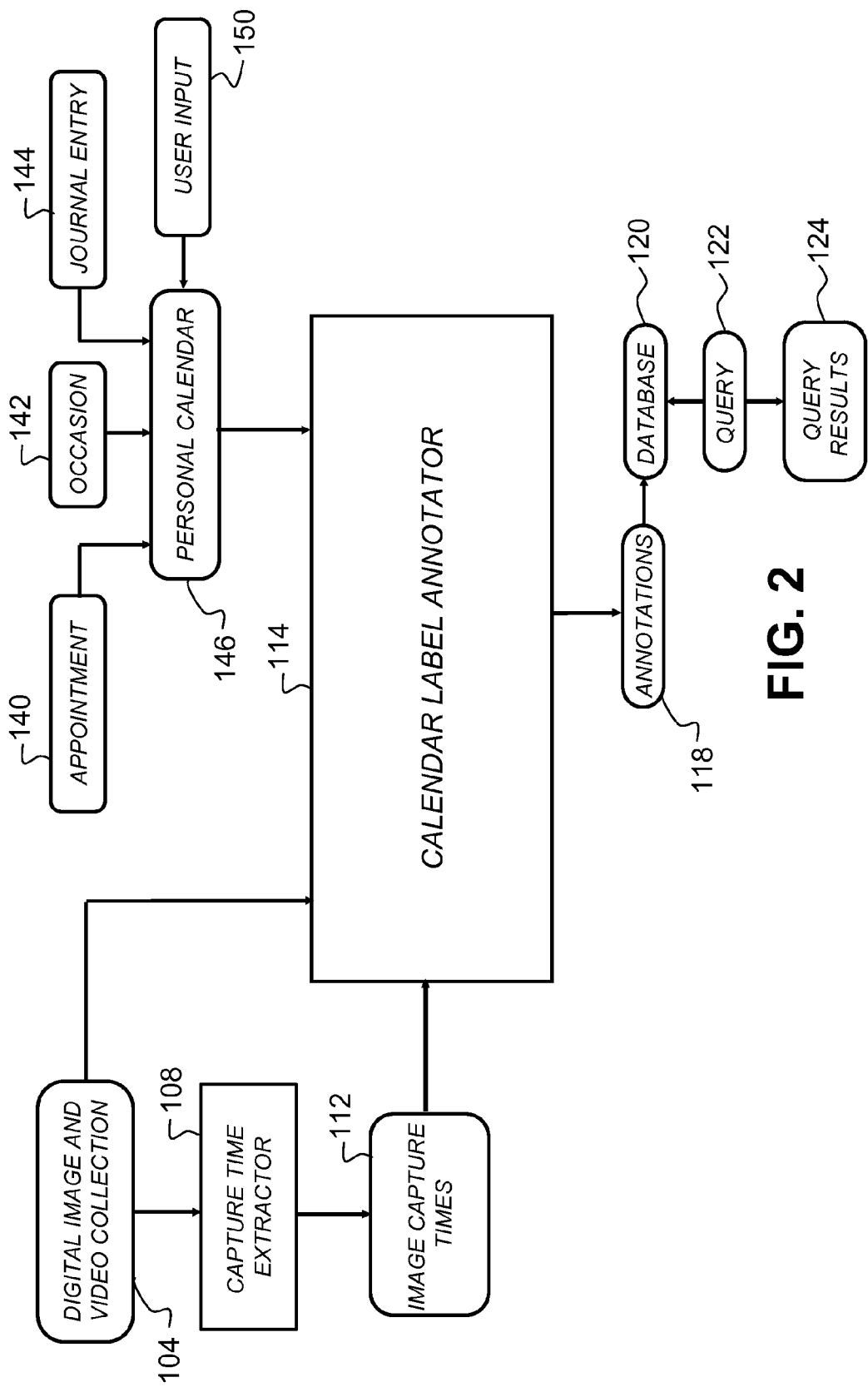
FIG. 2 is a flow chart of an embodiment of the present invention.

An embodiment of the invention is illustrated in FIG. 2. A digital image and video 104 is input to a calendar label annotator 114. It should be understood that herein when referring to digital images, digital videos, being a collection of digital images, are also included. Special events from a personal calendar 146 are used by the calendar label annotator 114 to annotate the digital images and videos in the collection 104. The collection 104 can contain exclusively images, or exclusive videos, or some of each. Resulting annotations 118 (equivalently called labels) are stored in a database 120. Each annotation 118 can be stored with the image (e.g. in the file header) or in a database 120 either located with the digital image or video or remotely (e.g. on a computer server). The database 120 can be in any form. In addition, the database 120 can be distributed across many files or few files. Consequently, the database 120 can be queried 122 to find those images and videos 104 containing the query special event. For example, a query 122 for images of "Daytona Beach" returns query results 124 containing the set of digital images or videos 104 with a related annotation of "vacation to Daytona Beach." Then query results 124 can be returned. The query results 124 are the set of digital images and videos 104 associated with the query special event.

The digital image and videos from the collection 104 are passed to a capture time extractor 108. The capture time extractor 108 determines the time each digital image or video 104 was captured, and outputs image capture times 112. The image capture time 112 of the digital image or video 104 is determined by one of several methods by the capture time extractor 108. Typically the capture time is embedded in the file header of the digital image or video 104. For example, the EXIF image format (described at www.exif.org) allows the image capture device 10 to store information associated with the digital image or video 104 in the file header. The "Date\Time" entry is associated with the date and time the image was captured. In some cases, the digital image or video 104 results from scanning film or prints and the image capture time 112 is determined by detection of the date exposed into the image area (as is often done at capture time), usually in the lower right corner of the image. The date a photograph is printed is often printed on the back of the print. Alternatively, some film systems (such as APS) contain a magnetic layer in the film for storing information such as the capture date. The capture time extractor 108 uses the most appropriate method for extracting the image capture time 112 of the image. Preferably, the source of the digital images and videos 104 is a digital camera, and the capture time extractor 108 extracts the capture time from the file information.

Note that the image capture time 112 can be a precise minute in time, e.g. Dec. 9, 2000 at 10:00 AM. Or the image capture time 112 can be less precise, e.g. 2000 or December 2000. The image capture time 112 can be in the form of a probability distribution function e.g. Dec. 9, 2000 +/−2 days with 95% confidence. The image capture time 112 is input to the calendar label annotator 114.

The personal calendar 146 is preferably a software application running on a computer that is useful for recording special events. For example, the special events can be input to the personal calendar 146 by the user or by others or other applications. The special events recorded in the personal calendar 146 are of three types; occasions, appointments, and journal entries. Essentially, the special events are labels for blocks of time that are personalized to the user (or users) of the calendar. For example, Outlook by Microsoft and Notes by Lotus are both examples of calendar applications. The personal calendar 146 can also be an application that operates on a handheld device, such as a personal digital assistant (PDA) or a cellular telephone camera, as will be described later in reference to FIG. 11. The personal calendar 146 can also be an application that runs on a server and is accessed by the user via the Internet.

The first type of the three special events recorded in a personal calendar 146 is an occasion 142. The occasion 142 is a periodically occurring special event, celebration, religious holiday (fixed or moveable), national holiday, festival, or the like. In general, occasions 142 can be computed in advance for any time period because mathematical formulas are used to determine the date of the occasion 142 in each subsequent year, as described by U.S. Pat. No. 6,108,640. In general, an occasion 142 is a name placed on an entire day. For example, every year Christmas is December 25. The occasions 142 celebrated by, observed by, or relevant to a particular person depend on a number of factors, including geographical, religious, and political factors. The user can indicate to the personal calendar 146 which occasions 142 are relevant for him or her via user input 150. The user can select relevant holidays from a list, or select between sets of holidays (i.e. Canadian holidays vs. American holidays), or indicate the geographic, religious, and political factors and have the computer guess at the set of relevant occasions to the user, which can then be refined through further user input 150. While holidays such as Easter, Christmas, Hanukkah and the like are widely observed; most people also celebrate personal occasions 142 such as birthday anniversaries, wedding anniversaries, etc. These birthday and wedding anniversaries can be for the user's family and close friends. The user indicates these personal occasions 142 via user input 150 to the personal calendar 146. The user can indicate special events by user inspection (i.e. selecting from lists of occasions presented to the user via the display device 50 as shown in FIG. 1) or automatically or both.

A second type of special event is an appointment 140. Appointment 140 is a special event describing something planned to take place in the future that is relevant for the user or users of the personal calendar 146. In general, appointments 140 are not names placed on an entire day (as is the case with occasions). For example, an appointment 140 can be "doctor appointment at 2" or "Matthew's cub scout meeting at 6 PM" or also "meet Sarah at the zoo at 4 PM". The appointment 140 can span several days or weeks, such as "Camping vacation Aug. 9-14, 2004".

The third type of special event is a journal entry 144. The journal entry 144 is an entry to the personal calendar 146 describing events that have occurred in the past (as of the time of entry of the journal entry 144.) For example, the special event on Nov. 24, 2004 "Jonah first crawled today" is a journal entry because it describes events that already took place at the time of entry. Some journal entries 144 are quite lengthy, such as a diary where a user enters a few paragraphs describing the events and reflections of the day. These diary entries are journal entries 144 because they are associated with a particular calendar time, and are related to events associated with that calendar time. A modern form of the diary is a blog (or weblog) that allows users to keep an on-line diary on the Internet (e.g. www.blogger.com.)

Each special event has an associated calendar time. As previously stated, the calendar time associated with an occasion 142 is a single day. The calendar time associated with an appointment 140 can be a precise moment in time or a range of time. The range of time can be any length; seconds, minutes, days or weeks long for example. In fact, the calendar time associated with an appointment 140 can have only a starting time indicated (e.g. "doctor appointment at 2"). In this case, the appointment 140 ending time is estimated (e.g. to be 2 hours long). The journal entry's associated calendar time can be a precise moment in time or a range of time. The calendar time associated with a special event can be in the form of a probability distribution function e.g. a normal distribution centered on Dec. 9, 2000 at 10:00 AM with standard deviation of 2 days.

The calendar label annotator 114 compares the image capture time 118 with the special event times from the personal calendar 146. Special event times will be described further herein below. The calendar label annotator 114 can reside on a camera, a personal computer, a server, a cellular telephone, a PDA, or the like. The calendar label annotator 114 determines digital images and videos of interest from the collection 104 by comparing the associated image capture times 112 with the special event times associated with special events. Each digital image or video of interest is then associated with its corresponding special event, preferably by producing an annotation 118 stored in a database 120 indicating that the digital image or video 104 is associated with the special event.

Figure 3:
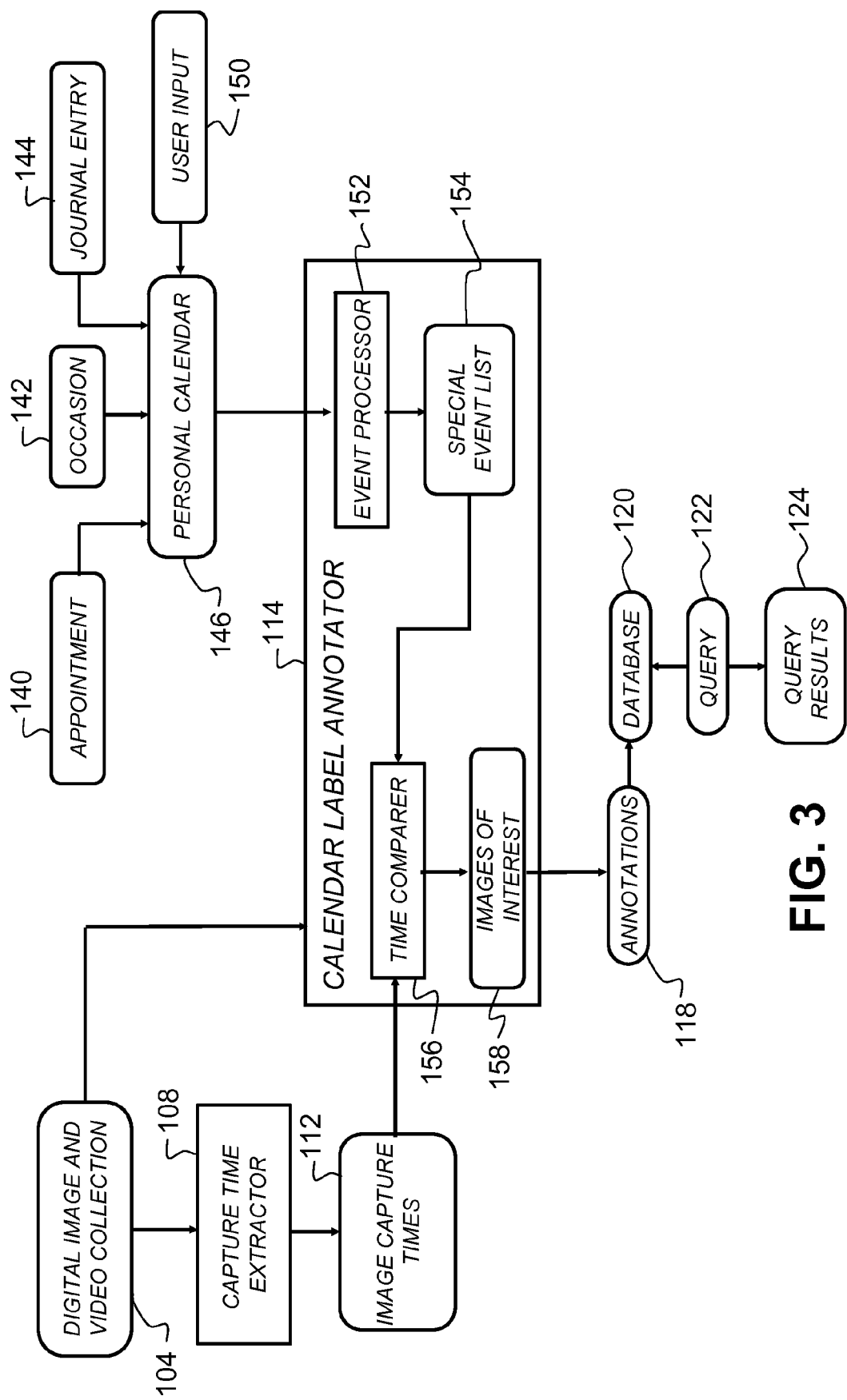
FIG. 3 is a more detailed flow chart of an embodiment of the present invention.

FIG. 3 shows a more detailed view of the calendar label annotator 114. The event processor 152 processes the special events from the personal calendar 146. The special events from the personal calendar 146 each have an associated calendar time, as previously described. In addition, the special events can have other information from user input 150. For example, each special event can have labeled whether it is an "imaging event" or not by the user. An imaging event is a special event that might correspond to digital images or videos 104 in the user's digital image and video collection 104. For example, the appointment "Vacation to the Beach" from Aug. 12-19, 2005 probably is an imaging event, while the appointment "dentist" at 4:00 Aug. 2, 2005 probably is not.

Figure 4:
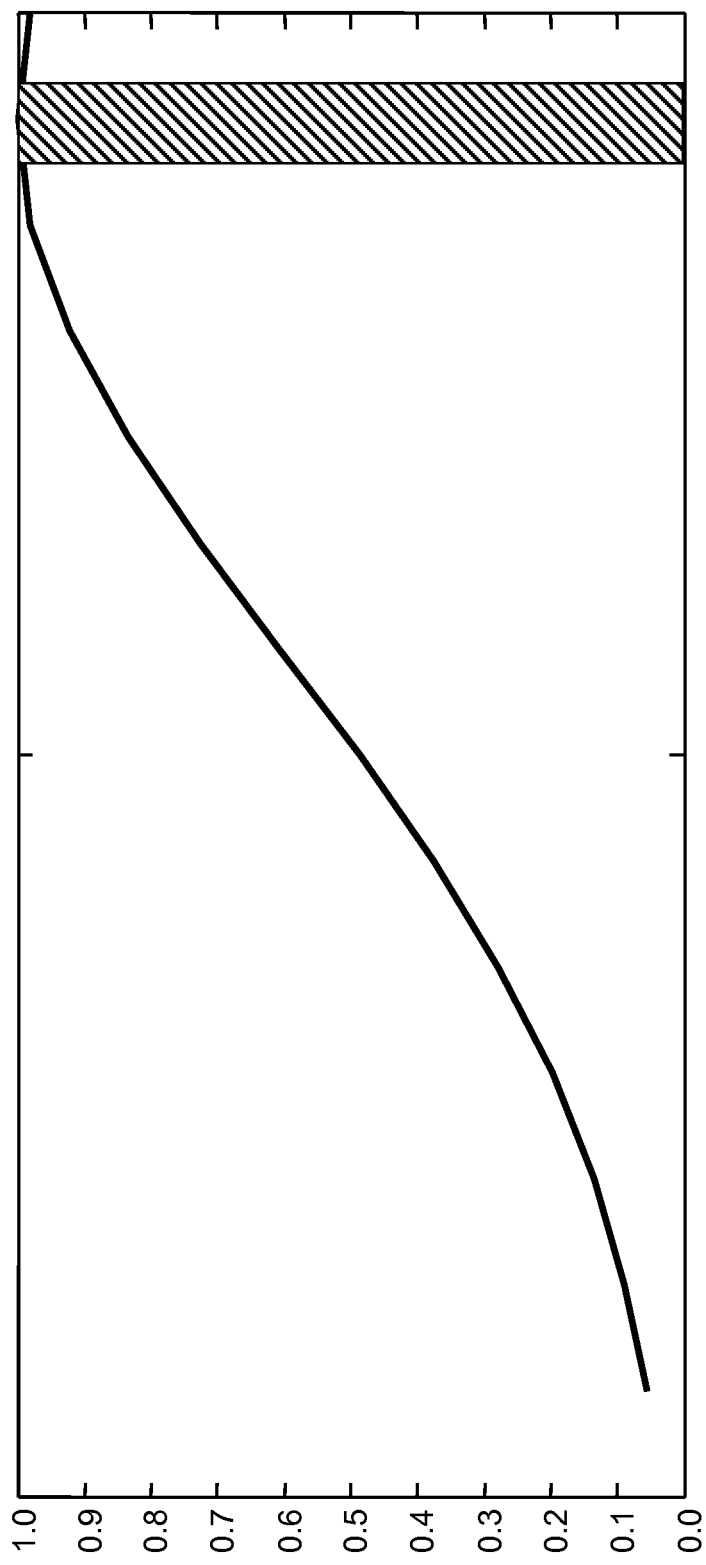
FIG. 4 is graph representation of a calendar time (cross hatch region) and a special event time (line) associated with the special event Christmas.

The event processor 152 determines a special event time for each special event. The special event time related to the calendar time associated with the special event, but generally has a broader time span to account for the fact that images related to a special event need not occur during the calendar time associated with the special event. The special event time is necessary because it is common for images and videos related to a special event to occur slightly before or after the calendar time associated with the special event. For example, a child's birthday occasion can be June 26, but the birthday party can be held on June 23. As another example, it is common that many images relate to Christmas even though captured before December 25. Images of setting up a Christmas tree, singing Christmas carols, or visiting St. Nicolas at the mall can occur days or weeks prior to the calendar time (Dec. 25) associated with the special event occasion of Christmas. The event processor 152 sets a special event time for each special event using user input 150 or a rule-based system. As with the image capture time 112 and the calendar time associated with special events, the special event time can be a period of time or represented as a probability distribution function. For example the user can indicate that the special event time associated with Christmas is the period of time beginning on Dec. 13 and ending on Dec. 26. The user can also indicate that the special event time for all birthdays is the period of time from 3 days prior to 3 days following the calendar time of the birthday. For example, FIG. 4 shows an illustrative plot of the calendar time and the special event time associated with Christmas 2004. The calendar time is shown as a hatched area and the special event time is shown with a line. If the user does not indicate special event times, then the following default rules are used to determine the special event time from the calendar time for a special event:

Appointments: a=b=0.1 (q−w)
Journal Entries: a=b=0
Occasions:
  Birthdays/anniversaries a=b=3 days
  Christmas a=20 days, b=1 day
  Other occasions a=b=1 days The special event time is computed as a time period beginning at time w−a, and ending at time q+b, where w is the beginning of the calendar time associated with the special event (or 5% of the calendar time when the calendar time is a probability distribution function p(x)), and q is the end of the calendar time associated with the special event (or 95% of the calendar time when the calendar time is a probability distribution function p(x)).

By inspection of the equations, it can be seen that the special event time associated with a special event is calculated from the calendar time associated with the special event.

The collection of special event times, whether automatically generated or manually entered, is a list of special event times.

Referring again to FIG. 3, the event processor 152 also determines the likelihood that special events from the personal calendar 146 are imaging events as previously mentioned. This determination can be based on user input 150 where the user indicates whether an event is an imaging event or not. Furthermore, in the absence of user input 150, the event processor 152 can automatically determine the likelihood that a special event is an imaging event. This is accomplished by collecting the images collections and personal calendars from a large number of people and manually determining the relationships between images and videos in the collection 104 and special events in the calendar. The likelihood that special events are imaging events can therefore be learned in such fashion using well-known machine learning techniques. For example, it is extremely rare that images in a collection 104 correspond to appointments for medical treatment such as doctor and dentist visits. Therefore, the event processor 152 assigns a likelihood to each special event indicating the likelihood that the special event is an imaging event. The likelihood can be a probability or can be a binary flag. This flag is used to improve the accuracy of the annotation provided by the present invention. For example, images that happen by coincidence to have an image capture time 112 also corresponding to a special event time would normally be incorrectly annotated by the special event name. For example, a doctor appointment ended earlier than expected, then the person walked to a park and photographed ducks. The images of ducks would erroneously be associated with the annotation "Doctor Appointment" were it not that the event processor 152 determined that the doctor appointment is not an imaging event.)

The event processor 152 outputs a special event list 154. The special event list 154 is a list of special events including the name of the special event, the associated calendar time, and the associated special event time. The special event list 154 also indicates the likelihood that each special event is an imaging event as previously mentioned. Additional information such as the people present at the special event, the location of the special event (e.g. my house, the park, Erie, Pa., etc.) can also be included for special events in the list.

The time comparer 156 compares the associated capture times for the digital images and videos in the collection 104 with a special event time or time period to determine digital images and videos of interest 158. Digital images and videos of interest 158 are those images and videos from the digital image and video collection having an image capture time 112 coincident with the special event time associated with a special event. For example, an image captured on Dec. 24, 2004 is an image of interest 158 associated with the special event occasion Christmas when the special event time associated with the occasion Christmas is as shown in FIG. 4. The image would then receive the annotation 118 "Christmas" that would be stored in association with the image in a database 120. Then, when a user places a query 122 for images of "Christmas", the database 120 is searched by well-known techniques and the aforementioned image with image capture time 112 of Dec. 24, 2004 will be among the query results 124. The query results can then be shown on the display device 50 such as shown in FIG. 1.

An annotation 118 associated with a digital image or video of interest 158 is special event identifier information and can contain multiple fields, such as: the name of the special event, the associated calendar time, and the associated special event time, the number of and identities of people present at the special event (e.g. guest list for a birthday party), the location of the special event (e.g. my house, the park, Erie, Pa., etc.). The annotation 118 is information related to the special event. Note that the annotations 118 made automatically by comparing the image capture time to the special event time can be marked in the database 120 as being automatically generated. This allows a user to provide a query 122 and search the database 120 for matches considering just manually entered annotations 118, just automatically generated annotations 118, or combinations thereof as desired by the user.

Not all of the images and videos in the collection 104 will have capture times 112 that correspond to special event times associated with events in the special event list 154. In other words, not all of the digital images and videos from the collection 104 will be images and videos of interest 158. These images can be shown to the user on the display device 50 such as shown in FIG. 1 for manual labeling.

The time comparer 156 can output a confidence score associated with each image of interest 158 that depends on both the image capture time 112 of the image of interest and the special event time of the special event. Preferably, the confidence score is the value of the p(x) evaluated where x is the image capture time 112 (or mean image capture time when the image capture time is a probability distribution function).

Figure 5:
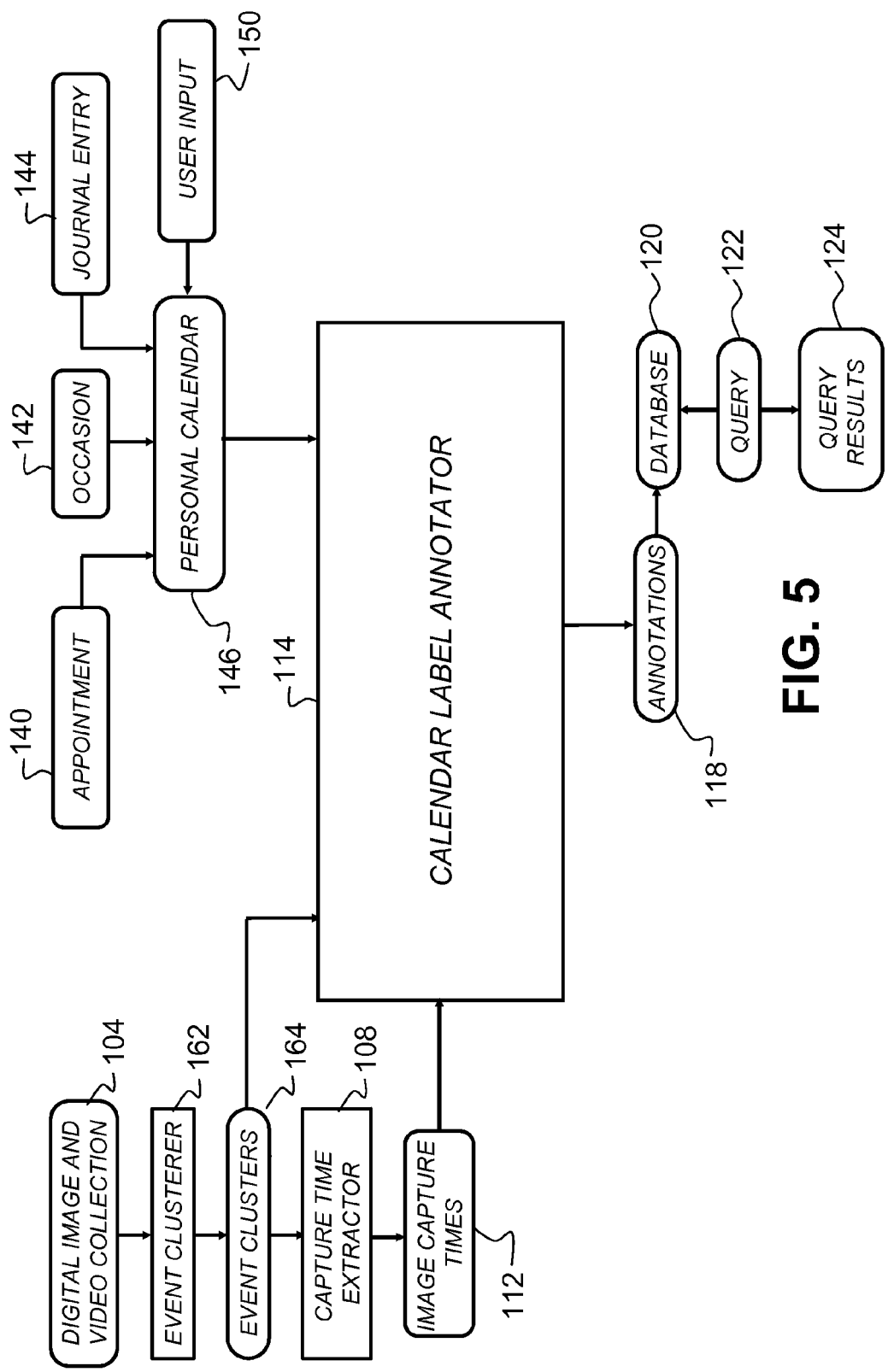
FIG. 5 is a flow chart of an embodiment of the present invention.

An alternative embodiment is illustrated in FIG. 5. In this embodiment, the digital image and video collection 104 is input to an event clusterer 162 for clustering the digital images and videos 104 into event clusters 164 which are mutually exclusive smaller sets of digital images and videos 104 according to image content and image capture times 112. Each set of digital images and videos 104 corresponds to a chronologically related segmentation of the digital image and video collection 104. In other words, each event cluster 164 contains all images from the digital image and video collection 104 captured after the earliest image or video in the event cluster and before the latest image in the event cluster 164. Commonly assigned U.S. Pat. No. 6,606,411 to Loui and Pavie, incorporated herein by reference, describes the production of event clusters 164 from a set of digital images and videos 104 in detail.

The capture time extractor 108 then inputs each event cluster 164 and determined the image capture times 112 associated with each event cluster 164. Preferably, the image capture time 112 for a particular event cluster 164 is a time period or time range spanning the time between the earliest and the latest image in the event cluster 164. The image capture times 112 and the pre-determined groups of images and videos called event clusters 164 are input to the calendar label annotator 114 along with the personal calendar 146 for producing annotations 118 that are associated with the event clusters 164 in a database 120. This alternative embodiment illustrates the utility of the present invention for annotating groups of images and videos in addition to the aforementioned utility of annotating single images and videos from a collection of digital images and videos 104. In this embodiment, the comparing step performed by the time comparer 156 of FIG. 3 includes associating pre-determined groups of images with a special event by comparing the image capture times 112 associated with groups of images with the special event times.

Figure 6:
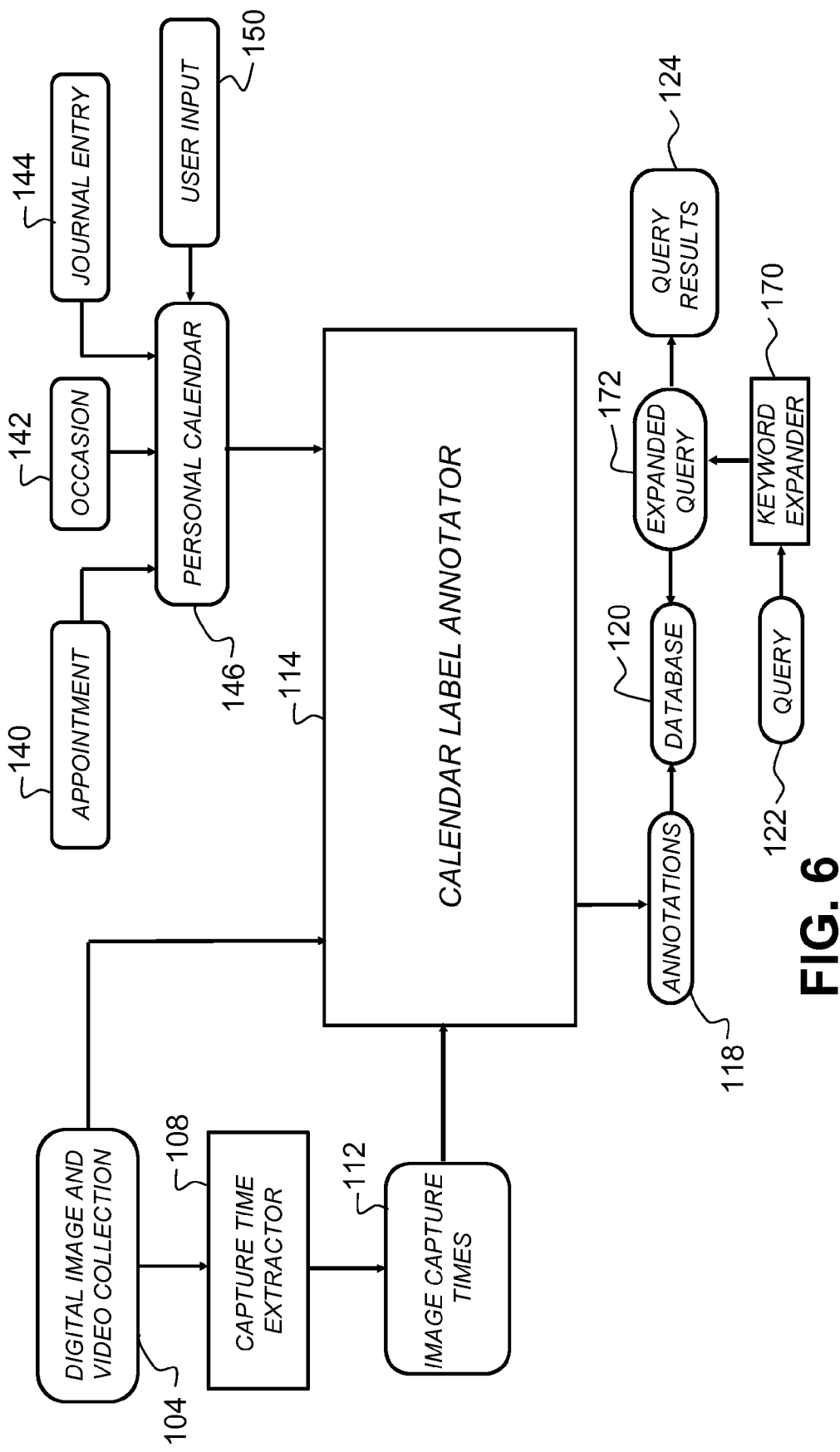
FIG. 6 is a flow chart of a further embodiment of the present invention.

A further alternative embodiment is illustrated in FIG. 6. In this embodiment, the database 120 containing annotations 118 from the calendar label annotator 114 is queried 122 by a user to find images of interest. For example, the user can search for images of interest by entering the query 122 of "mom". The query 122 is input to a keyword expander 170 which expands the terms in the query 122 by augmenting additional related words. The keyword expansion can be performed using techniques from the field of natural language expansion. For example, the database WordNet, maintained by Princeton University and available on-line at http://word-net.princeton.edu/, can be used to determine the word sense, part of speech, synonyms, hyponyms, hypernyms, etc. The keyword expander 170 then outputs an expanded query 172. For example, when the query 122 is "mom" the expanded query 172 is "mom", "mother", and "parent". Each of the additional query words added by the keyword expander 170 has an associated keyword score based on the strength of the relationship between the additional query word and the original query 122. For example, "mother" has a keyword score of 1.0 because it is a synonym for "mom" and "parent" has a keyword score of 0.4 because it has a related but not equivalent definition. The expanded query 172 is used to search the database 120 for images and videos having annotations related with the expanded query 172 terms. Continuing with the example, images and videos with the associated annotation "Mother's Day" would be detected and returned as the query results 124 for displaying to the user on the display device 50 such as shown in FIG. 1. Query results 124 can be sorted according to a relevance score, the keyword score, the capture time of the image or video, alphabetically according to the name of the image or video, or the like. A user can inspect the results and use manual tools to refine mistakes made by the automatic retrieval of the images and videos.

In another example, the query 122 for "animals" is processed by the keyword expander 170 to yield the expanded query "creatures", "zoo", and "farm". When the database 120 is searched for relevant images and videos, images labeled "Zoo Trip Apr. 6, 2005" are found and returned as the query results 124.

Annotations 118 stored in the database 120 are based on the special event names from the personal calendar 146. Additional annotations can be generated to store in the database from the special event names. Preferably, additional annotations are hypernyms of the special event names. For example, if the special event name is "dog show" then additional annotations could be "animal", "creature" and "living thing".

Figure 7:
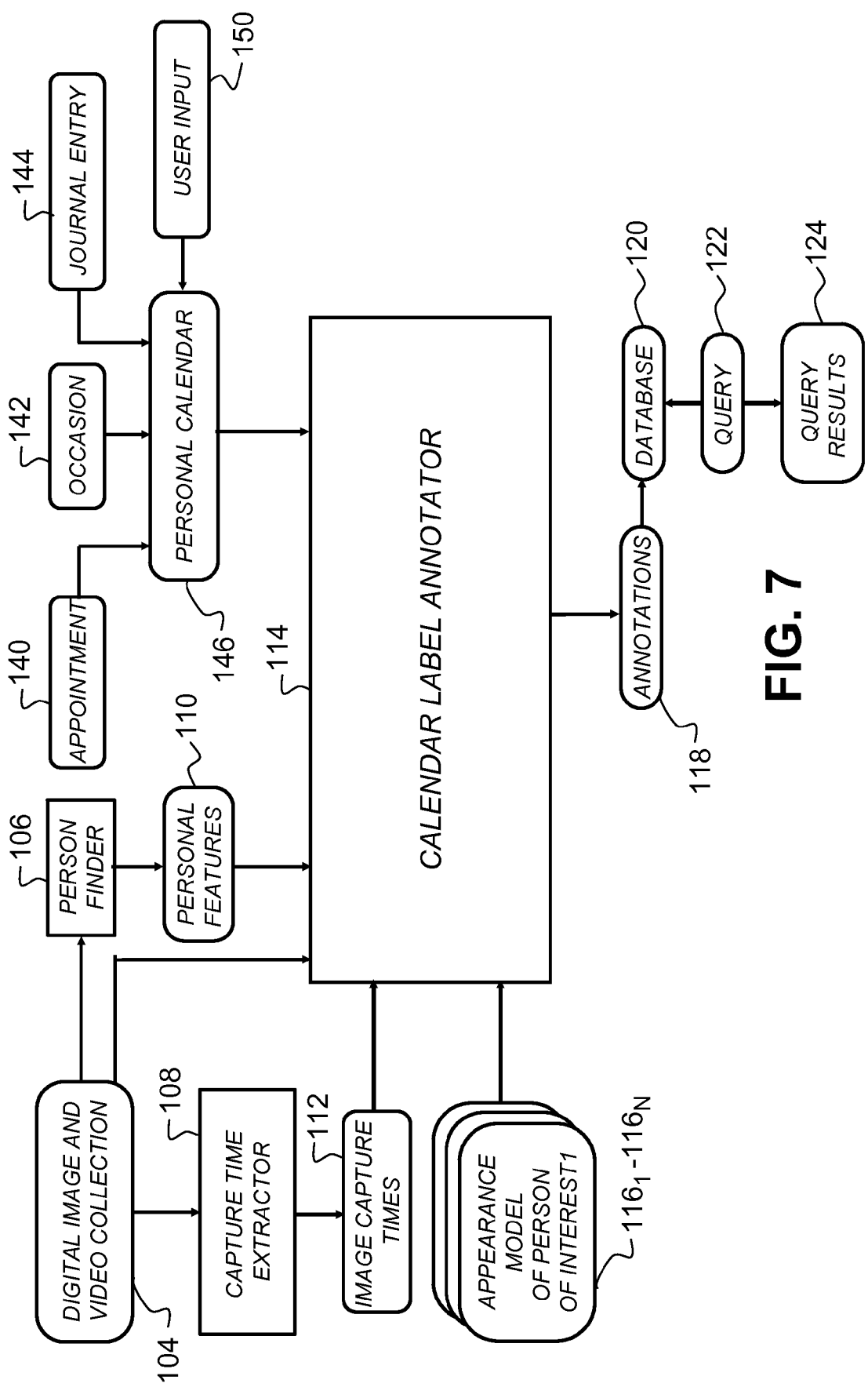
FIG. 7 is a flow chart of yet another embodiment of the present invention.

A further alternative embodiment is illustrated by FIG. 7. The digital image and video collection 104 is input to a person finder 106 for automatic detection of people in the images and videos. The calendar label annotator 114 inputs personal features 110, one set per person detected by the person finder 106, and also inputs appearance models $116_{1-N}$ of N different persons of interest. The calendar label annotator 114 also inputs image capture times 112 and special events from the personal calendar 146. As described hereinabove, the special events can contain the names (identities) of people present at a special event. The calendar label annotator 114 then recognizes persons of interest from the persons found by the person finder 106 using the appearance models 116, the image capture time 112 and the special events from the personal calendar 146.

When the special event contains a list of names of people present at a special event, then it is more likely than normal that these people will appear in images or videos captured at the event (i.e. images and videos of interest 158 for that particular event). Thus, in recognizing people in images and videos of interest for a particular event, greater weight (probability) is placed on people who have both appearance models 116 and were present at the special event of interest. This embodiment produces more accurate recognition of people in a digital image and video collection 104.

Figure 8:
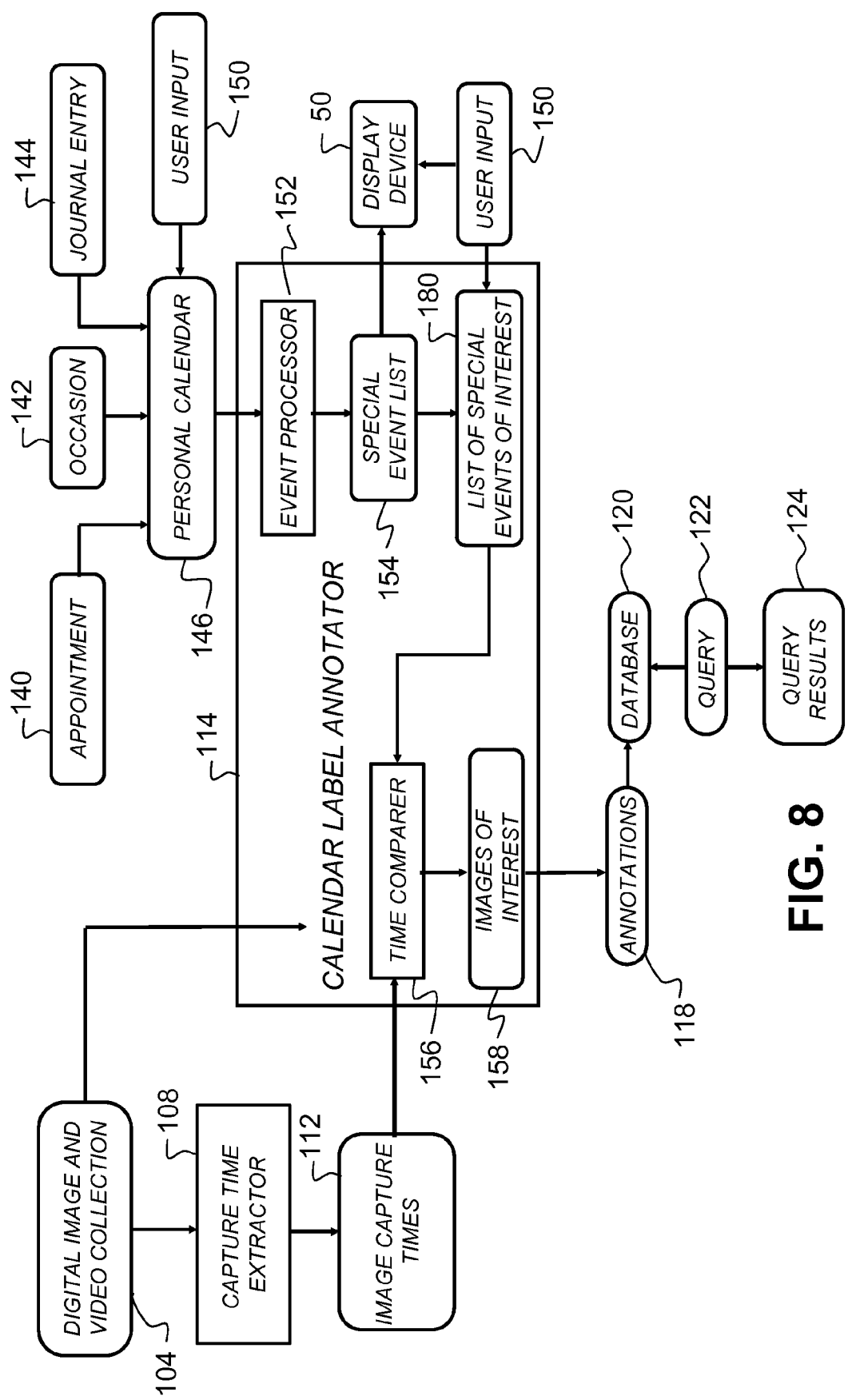
FIG. 8 is a flow chart of another embodiment of the present invention.

A further embodiment is shown in FIG. 8. In this embodiment, the list of special events 154 is presented to the user via the display device 50. The user then selects a subset of the displayed special events, thereby defining a list of special events of interest 180. The list of special events 154 can be displayed as a text list of the titles of the special events and the associated calendar times.

Alternatively, the list of special events can be displayed as a calendar with the positions of the titles of the special events indicative of the calendar times associated with the special events. This type of calendar display is commonly known and practiced for calendar applications. The title of a particular special event can be replaced by or augmented by an image or video of interest 158 associated with that particular special event. The list of special events of interest 180 is then passed to the time comparer 156 for finding images and videos of interest 158 associated with the special events of interest 180. This interface allows the user to retrieve images of interest for annotation from only the special events of interest 180 rather than all of the special events 154.

Figure 9:
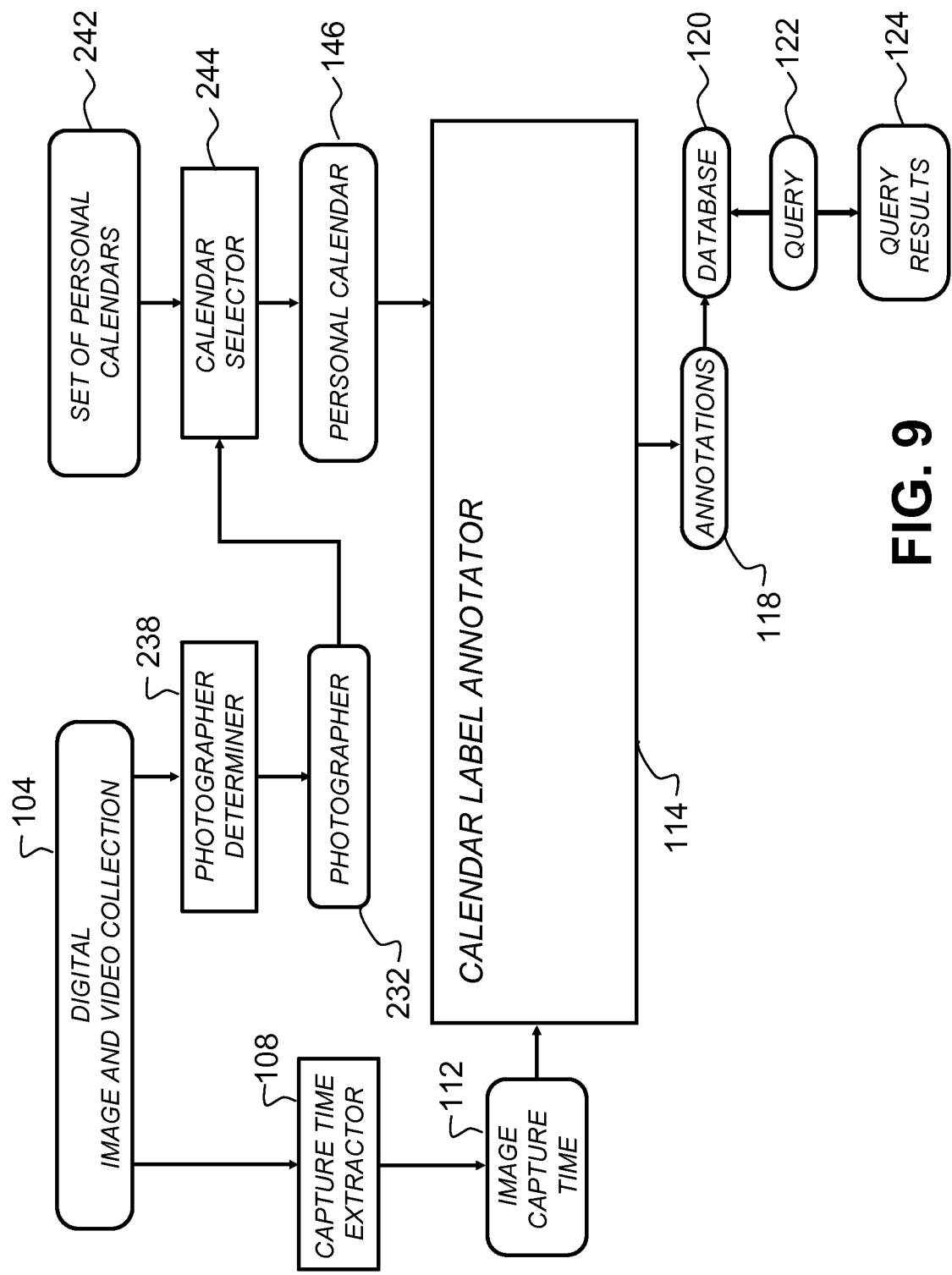
FIG. 9 is a flow chart of a still further embodiment of the present invention.

A still further embodiment is shown in FIG. 9. The personal calendar 146 is selected from among a set of personal calendars 242 by the calendar selector 244. The calendar selector 244 selects the personal calendar 146 for passing to the calendar label annotator 114 that corresponds to the identity of a photographer 232.

The images and videos of the collection 104 are also analyzed by a photographer determiner 238 to determine the identity of the particular photographer for each image and video. When the EXIF file format is use, the identity of the photographer 232 can be stored in the "Camera Owner", "Image Creator", "Photographer", or "Copyright" tags for example. The identity of the photographer of an image or video can be enterer manually before, during, or after capturing the video. Furthermore, several cameras (e.g. in U.S. Patent Application Publication 20020080256A1) have been described that contain means for extracting biometric information from the photographer 232, identifying the photographer 232, and then annotating the image with the identity of the photographer 232. In any case, the photographer determiner 238 discovers the identity of the photographer 232 and passes that information to the calendar selector 244. In some cases, the photographer 232 cannot be identified by the photographer determiner 238. In this case, the photographer 232 is "unknown". For example, this situation can occur when a person who owns the camera is on vacation and asks a stranger to use her (the vacationing camera owner) camera to capture an image of her in front of a landmark. A camera such as described in U.S. Patent Application Publication 20020080256A1 can only feasibly identify the photographer 232 from a small set of potential camera users (e.g. the primary user is probably the camera owner, and secondary users are friends and family of the camera owner) whose profiles are known by the camera. In this case, an image captured by a stranger using the camera would simply be identified by the photographer determiner 238 as having an "unknown" photographer 232.

For example, each member of a family can have a personal calendar 146. The selection of the personal calendar 146 from a set of personal calendars can be based on the identity of the photographer 232 of each image or video. For example, an image captured by Jim is input to the calendar label annotator 114 for comparing the image capture time with the special event times associated with Jim's calendar.

Figure 10:
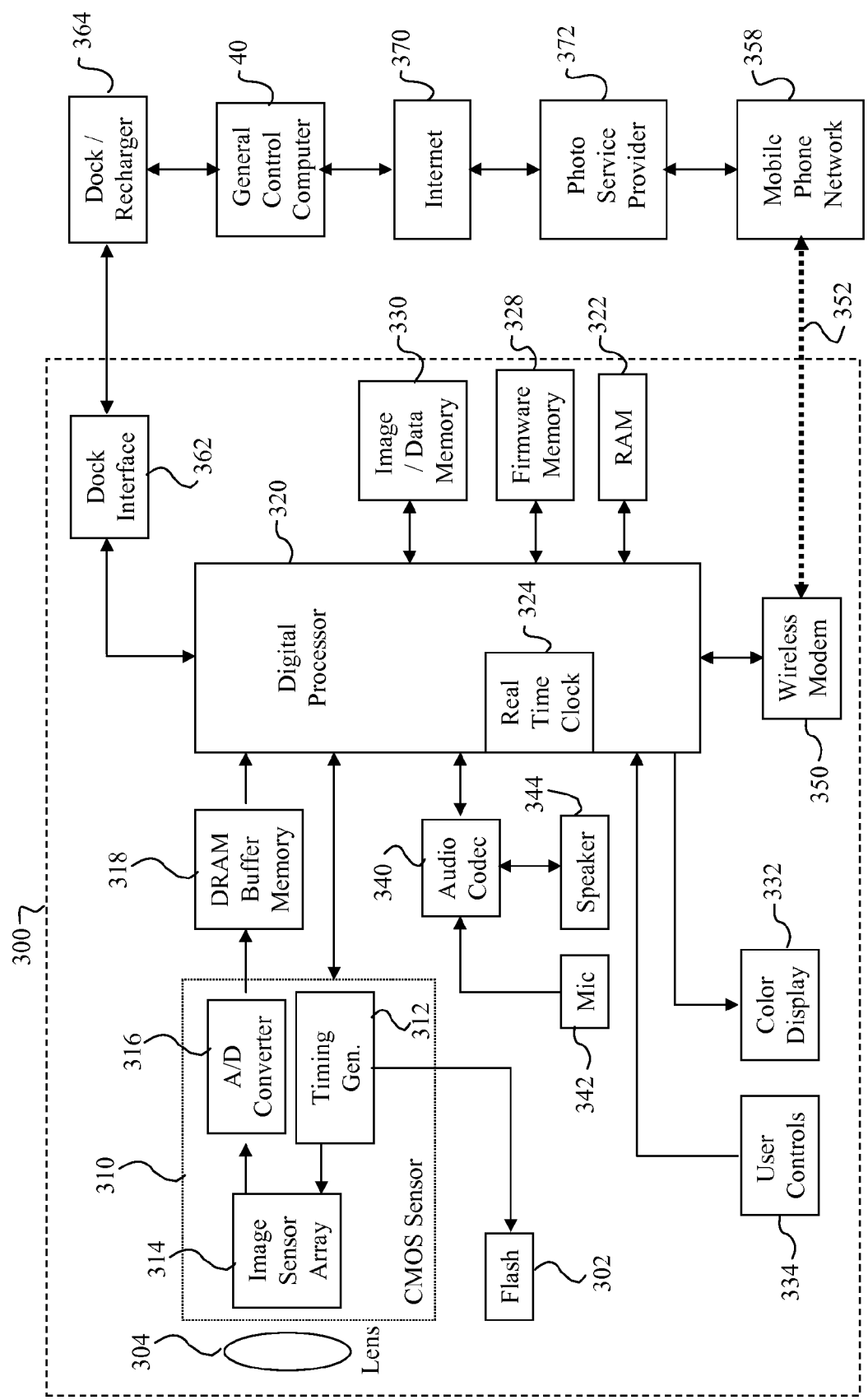
FIG. 10 is a block diagram of a camera phone based imaging system that can implement the present invention.

FIG. 10 is a block diagram of a digital camera phone 300 based imaging system that can implement the present invention. The digital camera phone 300 is one type of image capture device 10. Preferably, the digital camera phone 300 is a portable battery operated device, small enough to be easily handheld by a user when capturing and reviewing images. The digital camera phone 300 produces digital images that are stored using the image data/memory 330, which can be, for example, internal Flash EPROM memory, or a removable memory card. Other types of digital image storage media, such as magnetic hard drives, magnetic tape, or optical disks, can alternatively be used to provide the image/data memory 330.

The digital camera phone 300 includes a lens 304 which focuses light from a scene (not shown) onto an image sensor array 314 of a CMOS image sensor 310. The image sensor array 314 can provide color image information using the well-known Bayer color filter pattern. The image sensor array 314 is controlled by timing generator 312, which also controls a flash 302 in order to illuminate the scene when the ambient illumination is low. The image sensor array 314 can have, for example, 1280 columns×960 rows of pixels. In some embodiments, the digital camera phone 300 can also store video clips, by summing multiple pixels of the image sensor array 314 together (e.g. summing pixels of the same color within each 4 column×4 row area of the image sensor array 314) to create a lower resolution video image frame. The video image frames are read from the image sensor array 314 at regular intervals, for example using a 15 frame per second readout rate.

The analog output signals from the image sensor array 314 are amplified and converted to digital data by the analog-to-digital (A/D) converter circuit 316 on the CMOS image sensor 310. The digital data is stored in a DRAM buffer memory 318 and subsequently processed by an digital processor 320 controlled by the firmware stored in firmware memory 328, which can be flash EPROM memory. The digital processor 320 includes a real-time clock 324, which keeps the date and time even when the digital camera phone 300 and digital processor 320 are in their low power state.

The processed digital image files are stored in the image/data memory 330. The image/data memory 330 can also be used to store the user's personal calendar information, as will be described later in reference to FIG. 11. The image/data memory can also store other types of data, such as phone numbers, to-do lists, and the like.

In the still image mode, the digital processor 320 performs color interpolation followed by color and tone correction, in order to produce rendered sRGB image data. The digital processor 320 can also provide various image sizes selected by the user. The rendered sRGB image data is then JPEG compressed and stored as a JPEG image file in the image/data memory 330. The JPEG file uses the so-called "Exif" image format described earlier. This format includes an Exif application segment that stores particular image metadata using various TIFF tags. Separate TIFF tags can be used, for example, to store the date and time the picture was captured, the lens f/number and other camera settings, and to store image captions. In particular, the ImageDescription tag can be used to store labels, as will be described later in reference to FIG. 11. The real-time clock 324 provides a date/time value, which is stored as date/time metadata in each Exif image file.

The digital processor 320 also creates a low-resolution "thumbnail" size image, which can be created as described in commonly-assigned U.S. Pat. No. 5,164,831, entitled "Electronic Still Camera Providing Multi-Format Storage Of Full And Reduced Resolution Images" to Kuchta, et al., the disclosure of which is herein incorporated by reference. The thumbnail image can be stored in RAM memory 322 and supplied to a color display 332, which can be, for example, an active matrix LCD or organic light emitting diode (OLED). After images are captured, they can be quickly reviewed on the color LCD image display 332 by using the thumbnail image data.

The graphical user interface displayed on the color display 332 is controlled by user controls 334. The user controls 334 can include dedicated push buttons (e.g. a telephone keypad) to dial a phone number, a control to set the mode (e.g. "phone" mode, "calendar" mode" "camera" mode), a joystick controller that includes 4-way control (up, down, left, right) and a push-button center "OK" switch, or the like.

An audio codec 340 connected to the digital processor 320 receives an audio signal from a microphone 342 and provides an audio signal to a speaker 344. These components can be used both for telephone conversations and to record and playback an audio track, along with a video sequence or still image. The speaker 344 can also be used to inform the user of an incoming phone call. This can be done using a standard ring tone stored in firmware memory 328, or by using a custom ring-tone downloaded from the mobile phone network 358 and stored in the image/data memory 330. In addition, a vibration device (not shown) can be used to provide a silent (e.g. non audible) notification of an incoming phone call.

A dock interface 362 can be used to connect the digital camera phone 300 to a dock/charger 364, which is connected to the general control computer 40. The dock interface 362 may conform to, for example, the well-know USB interface specification. Alternatively, the interface between the digital camera 300 and the image capture device 10 can be a wireless interface, such as the well-known Bluetooth wireless interface or the well-know 802.11b wireless interface. The dock interface 362 can be used to download images from the image/data memory 330 to the general control computer 40. The dock interface 362 can also be used to transfer calendar information from the general control computer 40 to the image/data memory in the digital camera phone 300. The dock/charger 364 can also be used to recharge the batteries (not shown) in the digital camera phone 300.

The digital processor 320 is coupled to a wireless modem 350, which enables the digital camera phone 300 to transmit and receive information via an RF channel 352. The wireless modem 350 communicates over a radio frequency (e.g. wireless) link with a mobile phone network 358, such as a 3GSM network. The mobile phone network 358 communicates with a photo service provider 372, which can store digital images uploaded from the digital camera phone 300. These images can be accessed via the Internet 370 by other devices, including the general control computer 40. The mobile phone network 358 also connects to a standard telephone network (not shown) in order to provide normal telephone service.

Figure 11:
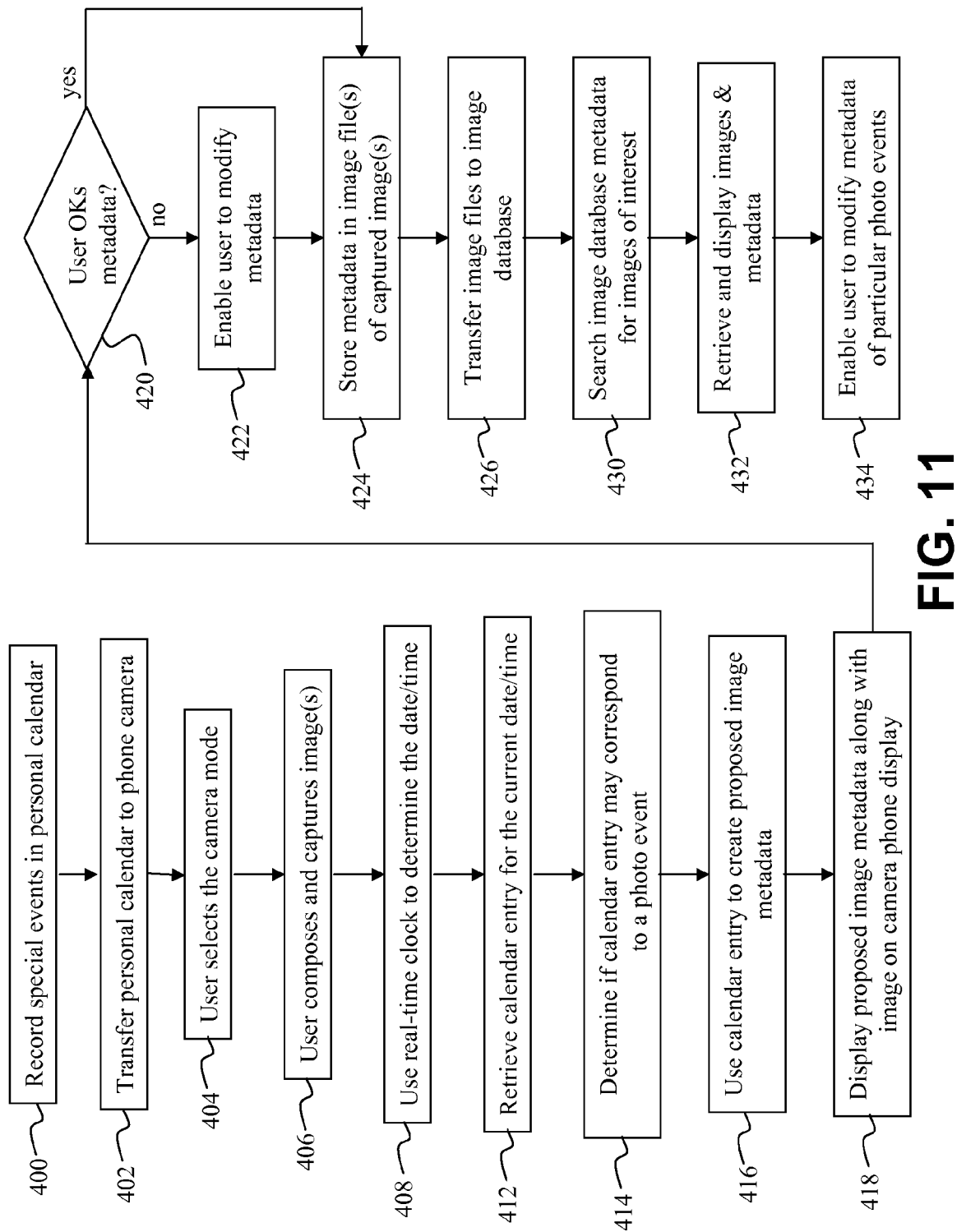
FIG. 11 is a flow chart of yet another embodiment of the present invention.

FIG. 11 is a flow chart of yet another embodiment of the present invention. This embodiment can use the digital camera phone 300 based imaging system described earlier in reference to FIG. 10. In this embodiment, the calendar information is stored in the digital camera phone 300 and accessed in order to provide appropriate labels for digital images as they are captured.

In block 400, special events are recorded in the personal calendar 146. This can be done using general control computer 40. As described earlier in reference to FIG. 2, the special events recorded in the personal calendar 146 can include appointments 140 and occasions 142. These special events are labels for blocks of time that are personalized to the user of the digital camera phone 300.

In block 402, the personal calendar 146 is transferred to the digital camera phone 300. The transfer can be accomplished by using the dock/recharger 364 and dock interface 362 to transfer the calendar data from a hard drive (not shown) of the general control computer 40 to the digital processor 320 in the digital camera 300. The digital processor 320 then stores the personal calendar 140 in the image/data memory 330.

The digital camera phone 300 includes user controls 334 that enable the user to select various operating modes. In the "phone" mode, the digital camera phone 330 operates as a standard mobile phone. In the "calendar" mode, the digital camera phone 330 displays calendar information on the color display 332. This enables the user to review and modify the appointments 140 or occasions 142 stored as part of the personal calendar 146 in the image/data memory 330. In a "camera" mode, the digital camera phone 300 operates as a still or video camera, in order to capture, display, and transfer images.

In block 404, the user selects the camera mode. In block 406, the user composes the image(s) to be captured, using the color display 332 as a viewfinder, and presses one of the user controls 334 (e.g. a shutter button, not shown) to capture the image(s). The image signals provided by the image sensor array 314 are converted to digital signals by A/D converter circuit 316 and stored in DRAM buffer memory 318.

In block 408, the digital processor 320 reads the value of the real time clock 324 after each image is captured, to determine the date and time the picture was taken. In block 412, the digital processor 320 retrieves the calendar entry for the date/time provided by the real time clock 324.

In block 414, the digital processor 320 determines if the calendar entry for the current date/time corresponds to a special event time, as was described earlier in reference to FIG. 3.

In block 416, the digital processor 320 uses the calendar entry to create proposed image metadata. For example, if the calendar entry is "Matthew's Soccer game", the proposed image metadata could be "Event: Soccer game, Subject: Matthew".

In block 418, the proposed image metadata is displayed on the color display 332 along with the image(s) captured in block 406. This enables the user to see the proposed image metadata, and check whether or not it is an appropriate label for the captured image(s). In addition to displaying the proposed image metadata, the processor 320 displays a request for the user to approve the proposed metadata. This can be done, for example, by displaying the text "OK?" along with "yes" and "no" selectable responses, on the color display 332.

In block 420, the user selects either the "yes" or "no" response, using the user controls 334. If the metadata is not appropriate, the user selects the "no" response. This can happen if the special event did not take place, for example if the soccer game was cancelled, so that the images correspond to a different type of event.

In block 422, if the user does not "OK" the metadata, ("no" to block 420) the digital processor 320 displays a user interface screen on the color display 332 which enables the user to modify the metadata. This can be done by simply deleting the metadata, or by selecting alternate metadata. The alternate metadata can be selected from a list of frequently used labels (e.g. Science museum, playground) or can be manually entered text strings.

It should be noted that once the user has approved or modified the metadata for one image (using blocks 412-422) in order to create an acceptable label for the images, there is normally no need to repeat these steps during the same photo event. Thus, the approved (or modified) metadata can be automatically stored in the image files of all subsequent images taken of the same photo event (for example for all images taken until the camera is turned off), without repeating blocks 416-422.

In block 424, if the user "OKs" the metadata, ("yes" to block 420), or if the user provides modified metadata in block 422, the digital processor 320 stores the metadata in the image file(s) of the captured image(s). For example, the metadata can be stored in the ImageDescription tag of the Exif file which contains the captured still image.

In block 426, the image files are transferred to the database 120. This can be done, for example, by using the wireless modem 350 to transmit the image files over the mobile phone network 358 to the photo service provider 372. The photo service provider 372 can then store the image files, and enable them to be accessed by various computers, including general control computer 40, over the Internet 370. The image files can also be accessed by the digital camera phone 300, using the mobile phone network 358. Alternatively, the image files can be transferred to the general control computer 40 using the dock interface 362 and dock/recharger 364. The metadata in the image file, such as the Date/Time metadata and the special event labels stored using the ImageDescription tag, can also be read from each image file and stored in a separate metadata database along with the image name, to enable more rapid searching.

In block 430, the metadata of the database 120 is searched to locate images of interest. This can be accomplished by entering the query 122, as described earlier in reference to FIG. 6.

In block 432, the images having metadata which best match the query 122 are displayed. If the images are stored in the general control computer 40, they can be displayed on the display device 50. Alternatively, if the images are stored by the photo service provider 372, they can be transferred to the digital camera phone 300 using the mobile phone network 358 and displayed on the color display 332.

In block 434, the user can modify the metadata associated with particular photo events, in order to correct or augment the metadata labels. The modified metadata labels are then stored in the database 120.

Figure 12:
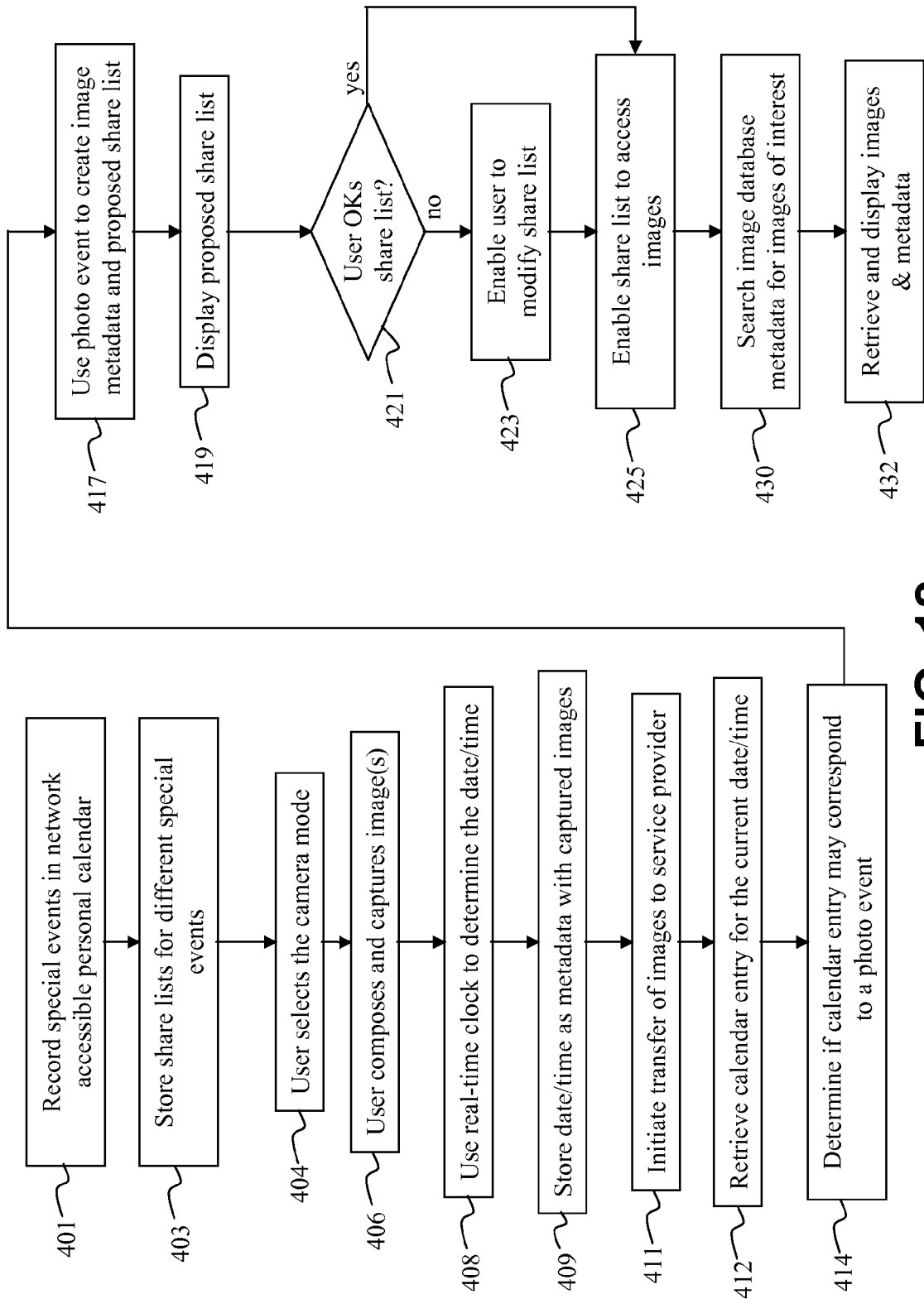
FIG. 12 is a flow chart of a still further embodiment of the present invention.

FIG. 12 is a flow chart of a still further embodiment of the present invention. In this embodiment, different special events are associated with different list of individuals (such as family, friends, team mates, work associates, etc.) who the user would like to be able to access the images of that type of special event taken by the user. For example, the user may want to allow all of Sarah's relatives to view images of Sarah's birthday, and may want to allow all of Matthew's teammates to view images of Matthew's soccer game.

In block 401, special events are recorded in a personal calendar 146, as described earlier in reference to block 400 of FIG. 11. In addition, the personal calendar 146 is made accessible over a network. This can be done by enabling the photo service provider 372 to access the personal calendar 146 via the Internet 370.

In block 403, share lists for at least some of the special events recorded in the personal calendar 146 are stored. This can be done, for example, by enabling the user to select, from the user's share list already provided by the photo service provider 372, those users that will be allowed to access images associated with different types of special events. For example, there might be a first list of family and friends that are allowed to access holiday and birthday images, a second list of teammates that are allowed to access images of team events, and a third list of work colleagues that are allowed to access images of work associated events. In addition, an event-specific share list can be created automatically by adding all of the participants of a particular event recorded in a personal calendar (e.g. all of the people invited to a party or a meeting) to the share list for that special event.

In block 404, the user selects the camera mode and in block 406, the user composes the image(s) to be captured, as was described earlier in reference to FIG. 11.

In block 408, the digital processor 320 reads the value of the real time clock 324 after each image is captured, to determine the date and time the picture was taken. In block 409, the date/time is stored as metadata is association with the captured image(s), for example in the Date/Time TIFF tag of the Exif image file.

In block 411, the digital processor 320 in the digital camera phone 300 initiates the transfer of the captured image(s) to the database. This can be done automatically after each image is captured or after a certain number of images are captured, or can be manually initiated by the user. Once initiated, the wireless modem 354 begins to transmit the image file(s) over the mobile phone network 358 to the photo service provider 372.

In block 412, photo service provider retrieves the calendar entry for the date/time stored in the transferred image file.

In block 414, the service provider 372 determines if the calendar entry for the current date/time corresponds to a special event time, as was described earlier in reference to FIG. 11.

In block 417, the service provider 372 uses the photo event to create image metadata and a proposed "share list", which is one of the share lists stored in block 403. For example, if the calendar entry is "Matthew's Soccer game", the image metadata could be "Event: Soccer game, Subject: Matthew", and the proposed share list could be the list of all of Matthew's teammates.

In block 419, the share list is communicated to the digital camera phone 300 via the wireless modem 350, and is displayed on the color display 332 along with the image(s) captured in block 406. This enables the user to decide whether or not to share the captured images with the share list associated with the identified special event. In addition to displaying the share list (which can list individuals or the name of the group), the processor 320 displays a request for the user to approve the proposed share list. This can be done, for example, by displaying the text "OK?" along with "yes" and "no" selectable responses, on the color display 332.

In block 421, the user selects either the "yes" or "no" response, using the user controls 334. If the share list is not appropriate, the user selects the "no" response. This can happen if the special event did not take place, for example if the soccer game was cancelled, so that the images correspond to a different type of event.

In block 423, if the user does not "OK" the share list, ("no" to block 421) the digital processor 320 displays a user interface screen on the color display 332 which enables the user to modify the share list. This can be done by simply not allowing the images to be shared with anyone else, or by selecting an alternative share list.

It should be noted that once the user has approved or modified the share list for one image (using blocks 412-423), there is normally no need to repeat these steps during the same photo event. Thus, the approved (or modified) share list can be automatically used for all subsequent images taken of the same photo event (for example for all images taken until the camera is turned off), without repeating blocks 414-423.

In block 425, if the user "OKs" the share list, ("yes" to block 421), or if the user provides a modified share list in block 423, the service provider 372 enables the uploaded images associated with the special event to be shared with those uses on the share list. The images can be shared using methods well-known in the prior art, for example by sending an email to each individual on the share list which contains a link to enable the images to be view using a web browser. The individuals on any share list can also be given other types of authorization, for example to order prints of the transferred images, as described in commonly assigned U.S. Pat. No. 5,760,917 to Sheridan, the disclosure of which is herein incorporated by reference.

In block 430, the metadata of the database 120 is searched to locate images of interest. The search can be performed either by the user of the digital camera 300, who has access to all of the images, or to individuals on one of the user's share lists, who have access to only those images associated with particular special events. This search can be accomplished by entering the query 122, as described earlier in reference to FIG. 6.

In block 432, the images having metadata which best match the query 122 are displayed. The images can be displayed on the display device 50 of the general control computer 40 or they can be transferred to the digital camera phone 300 using the mobile phone network 358 and displayed on the color display 332.

Figure 13:
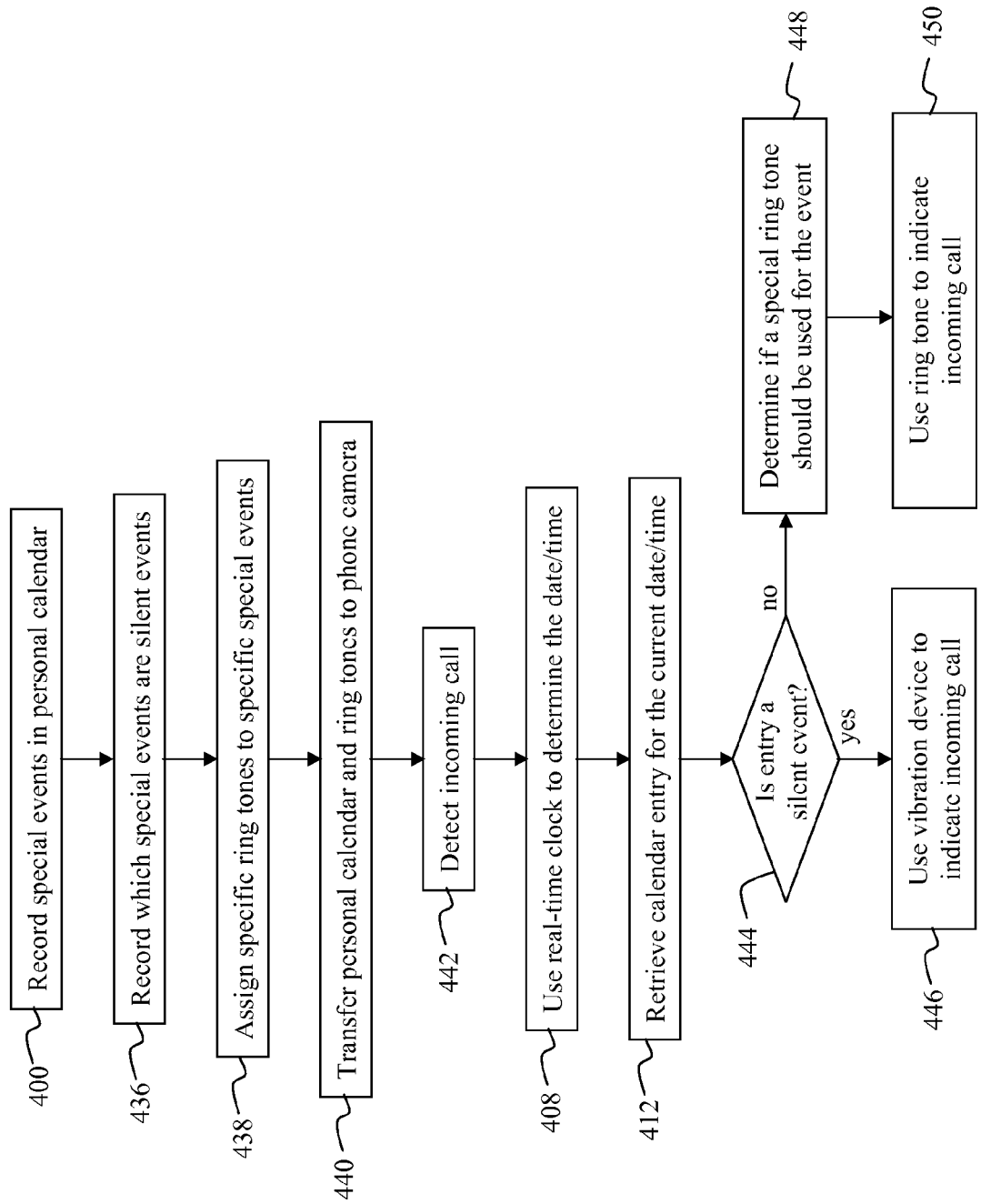
FIG. 13 is a flow chart of an additional embodiment of the present invention.

FIG. 13 is a flow chart of an additional embodiment of the present invention. In this embodiment, particular special events (such as important meetings, concerts, weddings, etc.) are recorded as silent events in the personal calendar. In addition, ring tones can be associated with other special events, such as an short excerpt from "Stars and Stripes forever" for the $4^{th}$ of July holiday, or "Happy birthday" for a birthday anniversary. When an incoming phone call is received by the user's phone camera, the personal calendar is checked to determine if the current date/time corresponds to a silent event. If it does, the vibration device is used to indicate to the user that there is an incoming call, instead of using a ring tone. If not, the personal calendar is checked to determine if a special ring tone should be used, instead of the default ring tone, to indicate the incoming call.

In block 400, special events are recorded in the personal calendar 146. This can be done using general control computer 40. As described earlier in reference to FIG. 2, the special events recorded in the personal calendar 146 can include appointments 140 and occasions 142. These special events are labels for blocks of time that are personalized to the user of the digital camera phone 300.

In block 436, the user can record whether some special events are silent events, during which they do not want their phone to ring. These silent events may include particular work-related meetings or social events, such as weddings, concerts, etc., where a ringing phone would annoy others and embarrass the user. The user can also specify that some recurring events (such as staff meetings or concerts) should always be silent events, so that they are automatically recorded as silent events whether a new event of this type is added to their calendar in block 400.

In block 438, the user can assign specific ring tones to specific special events. For example, the user can assign holiday ring tones (e.g. a Christmas theme, Thanksgiving theme, Halloween theme) to these holiday special events, a "Happy Birthday" song ring tone to birthday anniversary special events, etc.

In block 440, the personal calendar 146 and the assigned ring tones are transferred from the general control computer 40 to the digital camera phone 300, and stored in the image/data memory 330.

In block 442, the digital processor 320 detects an incoming phone call from the mobile phone network 358 via the wireless modem 350.

In block 408, the digital processor 320 reads the value of the real time clock 324 to determine the current date and time. In block 412, the digital processor 320 retrieves the personal calendar entry for the date/time provided by the real time clock 324.

In block 444, the digital processor 320 determines if the calendar entry for the current date/time corresponds to a silent event recorded in block 436.

In block 446, if the current date/time corresponds to a silent event (yes to block 444), the vibration device described earlier in reference to FIG. 10 is used to indicate that there is an incoming call.

In block 448, if the current date/time does not correspond to a silent event (no to block 444), the digital processor 320 determines if the current date/time corresponds to a special event which has been assigned a special ring tone.

In block 450, the digital processor 320 in the digital camera phone 300 uses either the special ring tone determined in block 448, or the default ring tone, to indicate to the user that there is an incoming phone call.

It should be noted that in some embodiments, different ring tones can be assigned to different callers. In this case, a particular special ring tone may be used only for certain callers. For example, the "Happy birthday" ring tone can be used only for calls from a phone number associated with the person who's birthday anniversary is the special event in the user's personal calendar. This can remind the user to convey a "happy birthday" message to the caller.

The invention has been described in detail with particular reference to certain preferred embodiments thereof, but it will be understood that variations and modifications can be effected within the spirit and scope of the invention.

PARTS LIST

10 image capture device
20 microprocessor unit (aka digital image processor)
30 image output device
40 general control computer
50 display device
60 keyboard
104 digital image and video (also referred to as "collection")
106 person finder
108 capture time extractor
110 personal features
112 image capture time
114 calendar label annotator
116 appearance models
118 annotations
120 database
122 queried or query
124 query results
140 appointment
142 occasion
144 journal entry
146 personal calendar
150 user input
152 event processor
154 special event list
156 time comparer
158 digital images and videos of interest
162 event clusterer
164 event clusters
170 keyword expander
172 expanded query
180 events of interest
232 photographer
238 photographer determiner
242 personal calendars
244 calendar selector
300 digital camera phone
302 flash
304 lens
310 CMOS image sensor
312 timing generator
314 image sensor array
316 A/D converter circuit
318 DRAM buffer memory
320 digital processor
322 RAM memory
324 real-time clock
328 firmware memory
330 image/data memory
332 color display
334 user controls
340 audio codec
342 microphone
344 speaker
350 wireless modem
352 RF channel
358 phone network
362 dock interface
364 dock/charger
370 Interent
372 service provider
400 block
401 bock
402 block
403 block
404 block
404 block
406 block
406 block
408 block
408 block
409 block
411 block
412 block
414 block
414 block
416 block
417 block
418 block 419 block
420 block
421 block
422 block
423 block
424 block
425 block
426 block
430 block
432 block
434 block
436 block
438 block
440 block
442 block
444 block
446 block
448 block
450 block

The invention claimed is:

1. A method for associating digital images with events, the method comprising:
   storing, by a computing device, a digital image associated with a user, wherein the digital image has an image capture time;
   processing, by the computing device, a journal entry of an electronic diary associated with the user to identify a previously occurring event and to identify a range of time for the previously occurring event, wherein the journal entry describes an event that has occurred in the past;
   comparing, by the computing device, the image capture time of the digital image with the range of time for the previously occurring event to determine if the digital image is associated with the previously occurring event; and
   producing, by the computing device, an annotation indicating the digital image is associated with the previously occurring event, wherein the annotation is based on a name associated with the previously occurring event.

2. The method of claim 1, further comprising storing the annotation in a database with the digital image.

3. The method of claim 1, further comprising storing the digital image and the annotation together in a digital image file.

4. The method of claim 3, wherein the storing the digital image and the annotation together in a digital image file comprises storing the annotation in a header of the digital image file.

5. The method of claim 1, wherein the producing the annotation comprises annotating the digital image.

6. The method of claim 1, further comprising assigning to the previously occurring event a likelihood that the previously occurring event is an imaging event.

7. The method of claim 6, wherein the likelihood comprises a probability that the previously occurring event is an imaging event.

8. The method of claim 6, wherein the likelihood comprises a binary flag indicating whether or not the previously occurring event is an imaging event.

9. The method of claim 6, further comprising determining if the previously occurring event is an imaging event based at least in part on the likelihood.

10. The method of claim 1, wherein the annotation includes a plurality of fields.

11. A method for associating digital images with events, the method comprising:
    storing, by a computing device, a digital image associated with a user, wherein the digital image has an image capture time;
    processing, by the computing device, a journal entry of an electronic diary associated with the user to identify a previously occurring event and to identify a range of time for the previously occurring event, wherein the journal entry describes an event that has occurred in the past;
    comparing, by the computing device, the image capture time of the digital image with the range of time for the previously occurring event to determine if the digital image is associated with the previously occurring event; and
    producing, by the computing device, an annotation indicating the digital image is associated with the previously occurring event, wherein the annotation includes two or more of a name associated with the previously occurring event, an associated calendar time of the previously occurring event, a number of people at the previously occurring event, an identity of a person at the previously occurring event, and a location of the previously occurring event.

12. The method of claim 1, wherein the annotation comprises information about the previously occurring event.

13. The method of claim 1, wherein the annotation is generated from the name of the previously occurring event.

14. The method of claim 1, wherein the annotation comprises a hyponym of the name of the previously occurring event.

15. A non-transitory computer-readable medium having instructions stored thereon that, upon execution by a computing device, cause the computing device to perform operations comprising:
    storing a digital image associated with a user, wherein the digital image has an image capture time;
    processing a journal entry of an electronic diary associated with the user to identify a previously occurring event and to identify a range of time for the previously occurring event, wherein the journal entry describes an event that has occurred in the past;
    comparing the image capture time of the digital image with the range of time for the previously occurring event to determine if the digital image is associated with the previously occurring event; and
    producing an annotation indicating the digital image is associated with the previously occurring event, wherein the annotation is based on a name associated with the previously occurring event.

16. The non-transitory computer-readable medium of claim 15, wherein the annotation is generated from the name of the previously occurring event.

17. The non-transitory computer-readable medium of claim 15, wherein the annotation comprises a hyponym of the name of the previously occurring event.

18. The non-transitory computer-readable medium of claim 15, wherein the annotation includes two or more of a name of the previously occurring event, an associated calendar time of the previously occurring event, a number of people at the previously occurring event, an identity of a person at the previously occurring event, and a location of the previously occurring event.

19. The non-transitory computer-readable medium of claim 15, wherein the operations further comprise storing the digital image and the annotation together in a digital image file.

20. The non-transitory computer-readable medium of claim 15, wherein the producing the annotation comprises annotating the digital image.

21. A system comprising:
a memory configured to store a digital image associated with a user, wherein the digital image has an image capture time; and
a processor configured to process a journal entry of an electronic diary associated with the user to identify a previously occurring event and to identify a range of time for the previously occurring event, wherein the journal entry describes an event that has occurred in the past,
wherein the processor is further configured to compare the image capture time of the digital image with the range of time for the previously occurring event to determine if the digital image is associated with the previously occurring event and to produce an annotation indicating the digital image is associated with the previously occurring event, wherein the annotation is based on a name associated with the previously occurring event.

22. The system of claim 21, wherein the annotation is stored in the memory with the digital image.

23. The system of claim 21, wherein the the digital image and the annotation are stored together in a digital image file.

24. The system of claim 23, wherein the annotation is stored in a header of the digital image file.

25. The system of claim 21, wherein the processor is configured to assign to the previously occurring event a likelihood that the previously occurring event is an imaging event.

26. The system of claim 25, wherein the likelihood comprises a probability that the previously occurring event is an imaging event.

27. The system of claim 25, wherein the likelihood comprises a binary flag indicating whether or not the previously occurring event is an imaging event.

28. A system comprising:
a memory configured to store a digital image associated with a user, wherein the digital image has an image capture time; and
a processor configured to process a journal entry of an electronic diary associated with the user to identify a previously occurring event and to identify a range of time for the previously occurring event, wherein the journal entry describes an event that has occurred in the past and to compare the image capture time of the digital image with the range of time for the previously occurring event to determine if the digital image is associated with the previously occurring event,
wherein the processor is further configured to produce an annotation indicating the digital image is associated with the previously occurring event, wherein the annotation includes two or more of a name associated with the previously occurring event, an associated calendar time of the previously occurring event, a number of people at the previously occurring event, an identity of a person at the previously occurring event, and a location of the previously occurring event.

29. The system of claim 28, wherein the annotation comprises information about the previously occurring event.

30. The system of claim 28, wherein the annotation is generated from the name of the previously occurring event.

31. The system of claim 28, wherein the annotation comprises a hyponym of the name of the previously occurring event.

32. A non-transitory computer-readable medium having instructions stored thereon that, upon execution by a computing device, cause the computing device to perform operations comprising:
storing a digital image associated with a user, wherein the digital image has an image capture time;
processing a journal entry of an electronic diary associated with the user to identify a previously occurring event and to identify a range of time for the previously occurring event, wherein the journal entry describes an event that has occurred in the past;
comparing the image capture time of the digital image with the range of time for the previously occurring event to determine if the digital image is associated with the previously occurring event; and
producing an annotation indicating the digital image is associated with the previously occurring event, wherein the annotation includes two or more of a name associated with the previously occurring event, an associated calendar time of the previously occurring event, a number of people at the previously occurring event, an identity of a person at the previously occurring event, and a location of the previously occurring event.

33. The computer readable medium of claim 32, wherein the annotation comprises information about the previously occurring event.

34. The computer readable medium of claim 32, wherein the annotation is generated from the name of the previously occurring event.

35. The computer readable medium of claim 32, wherein the annotation comprises a hyponym of the name of the previously occurring event.

* * * * *